(12) United States Patent
Hirata et al.

(10) Patent No.: US 10,293,268 B2
(45) Date of Patent: May 21, 2019

(54) BLOCK, BLOCK SYSTEM, INFORMATION PROCESSING APPARATUS, DISPLAY METHOD, AND INFORMATION PROCESSING METHOD

(71) Applicant: SONY INTERACTIVE ENTERTAINMENT INC., Tokyo (JP)

(72) Inventors: Shinichi Hirata, Kanagawa (JP); Takeshi Yamagishi, Kanagawa (JP); Hiroshi Osawa, Kanagawa (JP); Keiji Togawa, Tokyo (JP); Naoki Numaguchi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 132 days.

(21) Appl. No.: 15/102,550

(22) PCT Filed: Dec. 19, 2014

(86) PCT No.: PCT/JP2014/083729
§ 371 (c)(1),
(2) Date: Jun. 8, 2016

(87) PCT Pub. No.: WO2015/098757
PCT Pub. Date: Jul. 2, 2015

(65) Prior Publication Data
US 2016/0310861 A1    Oct. 27, 2016

(30) Foreign Application Priority Data

Dec. 26, 2013  (JP) ................................ 2013-269946

(51) Int. Cl.
*A63H 33/04*  (2006.01)
*A63F 13/25*  (2014.01)
(Continued)

(52) U.S. Cl.
CPC .......... *A63H 33/042* (2013.01); *A63F 13/25* (2014.09); *A63F 13/327* (2014.09); *A63F 13/98* (2014.09);
(Continued)

(58) Field of Classification Search
USPC .......................... 446/91, 117, 124, 175, 484
See application file for complete search history.

(56) References Cited

U.S. PATENT DOCUMENTS 6,443,796 B1 *  9/2002  Shackelford ......... A63H 33/042
                                                       273/237
8,257,157 B2 *  9/2012  Polchin ................... A63F 13/02
                                                         463/9
(Continued)

FOREIGN PATENT DOCUMENTS

JP    2003-132373 A    5/2003
JP    2005-137531 A    6/2005
(Continued)

OTHER PUBLICATIONS

Notification of Reasons for Refusal dated Sep. 5, 2017, from the corresponding Japanese Patent Application No. 2013-269946.
(Continued)

*Primary Examiner* — Kurt Fernstrom
(74) *Attorney, Agent, or Firm* — Katten Muchin Rosenman LLP

(57) ABSTRACT

A block system 1 includes a block 102 and a host terminal 10. The block 102, configured such that two or more blocks are connectable with each other, includes a power supply mechanism 110 for supplying power to the block 102, a communication mechanism 114 for establishing connection with the host terminal 10 to transmit and receive various signals, a storage mechanism 112 for storing identification information related with the block 102, a display mechanism
(Continued)

118 for emitting light and displaying an image under the control of the host terminal 10, and a control mechanism 116 for executing programmed processing in accordance with a signal from the host terminal 10.

10 Claims, 15 Drawing Sheets

(51) Int. Cl.
    *A63F 13/327*     (2014.01)
    *A63F 13/98*     (2014.01)
    *A63H 33/08*     (2006.01)

(52) U.S. Cl.
    CPC ....... *A63H 33/086* (2013.01); *A63H 2200/00* (2013.01)

(56) References Cited

U.S. PATENT DOCUMENTS

| | | | | |
|---|---|---|---|---|
| 9,914,066 | B2* | 3/2018 | Cletheroe | A63H 33/042 |
| 2002/0196250 | A1* | 12/2002 | Anderson | G06T 19/00 |
| | | | | 345/420 |
| 2003/0148700 | A1* | 8/2003 | Arlinsky | A63H 33/04 |
| | | | | 446/91 |
| 2011/0074833 | A1 | 3/2011 | Murayama et al. | |
| 2013/0217294 | A1 | 8/2013 | Karunaratne | |
| 2013/0217295 | A1* | 8/2013 | Karunaratne | A63H 33/086 |
| | | | | 446/124 |
| 2014/0127965 | A1* | 5/2014 | Adam | A63H 33/042 |
| | | | | 446/91 |
| 2016/0101370 | A1* | 4/2016 | Madsen | A63H 33/042 |
| | | | | 446/91 |

FOREIGN PATENT DOCUMENTS

| | | |
|---|---|---|
| JP | 2012-157568 A | 8/2012 |
| WO | 2008/146860 A1 | 12/2008 |
| WO | 2010/150232 A1 | 12/2010 |
| WO | 2013122798 A1 | 8/2013 |

OTHER PUBLICATIONS

International Preliminary Report on Patentability and Written Opinion of the International Searching Authority dated Jul. 7, 2016 from corresponding Application No. PCT/JP2014/083729.

International Search Report dated Feb. 10, 2015, from the corresponding PCT/JP2014/083729.

\* cited by examiner

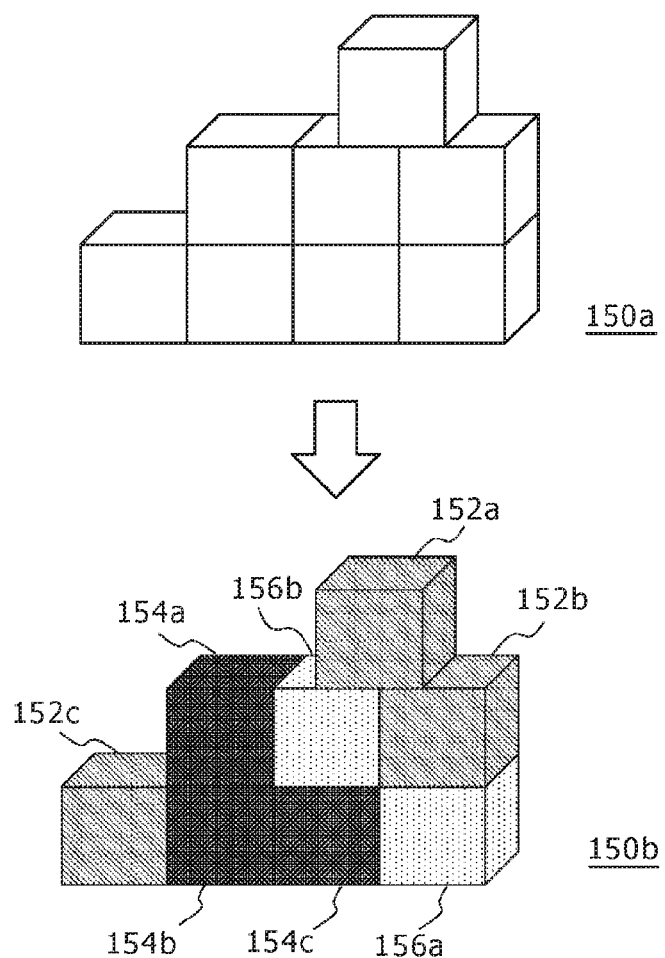

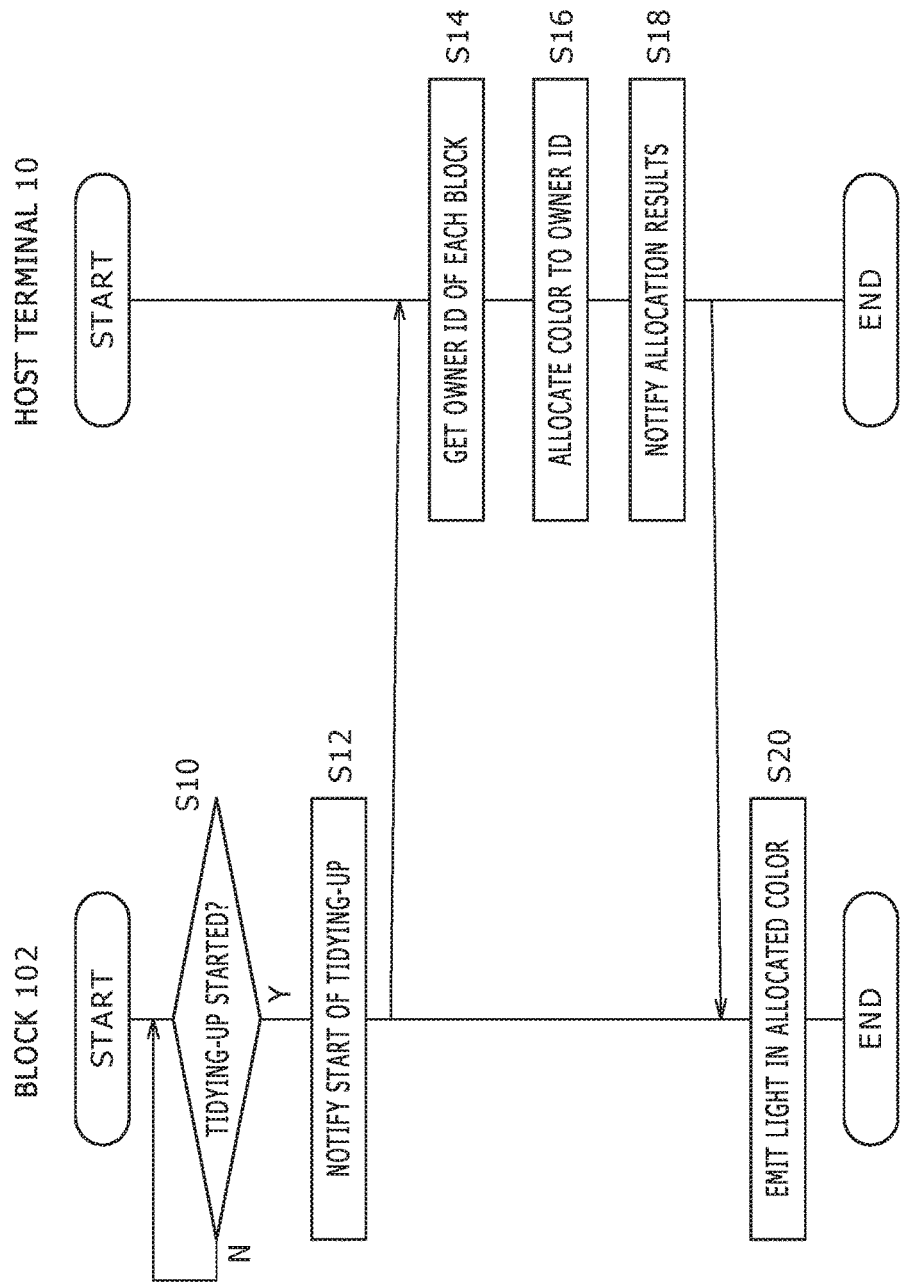

| INDIVIDUAL ID | SHAPE | SIZE | JOINT POSITION |
|---|---|---|---|
| 0001 | QUADRATIC PRISM | 4x4x8 | J1(1,2,2)<br>J2(2,1,2)<br>J3(2,4,2)<br>J4(2,7,2)<br>.... |
| 0002 | QUADRATIC PRISM | 3x4x6 | J1(1,1.5,1.5)<br>J2(2,1,1.5)<br>J3(2,3,1.5)<br>.... |
| 0003 | CUBE | 4x4x4 | J1(1,2,2)<br>J2(2,2,2)<br>.... |
| .... | .... | .... | .... |

| IN-SET GROUP ID | IN-SET INDIVIDUAL ID | INDIVIDUAL ID | LIGHT-EMISSION COLOR |
|---|---|---|---|
| 001 | 001 | 0008 | RED |
|  | 002 | 0004 |  |
|  | 003 | 0002 |  |
| 002 | 004 | 0012 | BLUE |
|  | 005 | 0009 |  |
| ... | ... | ... | ... |

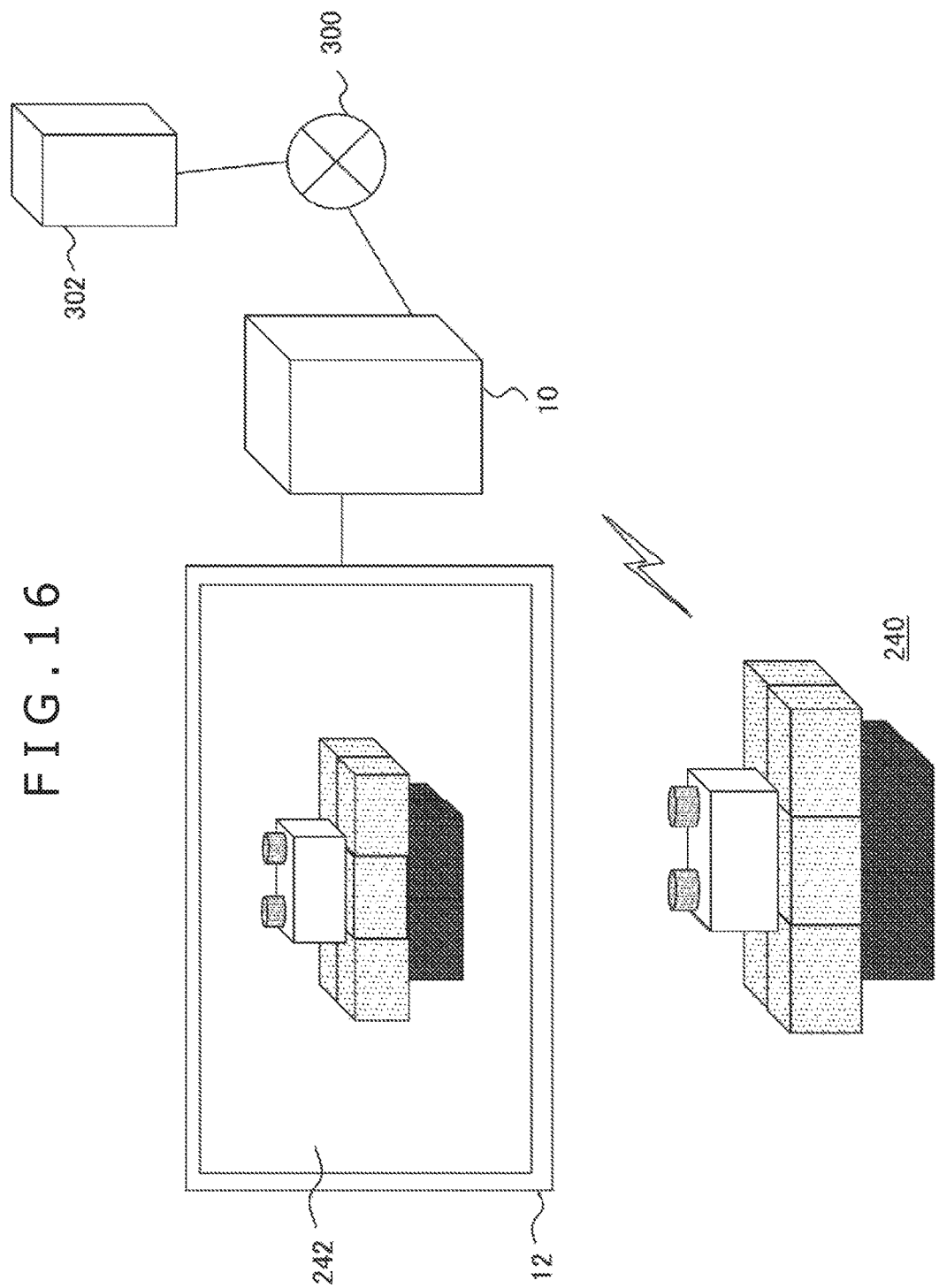

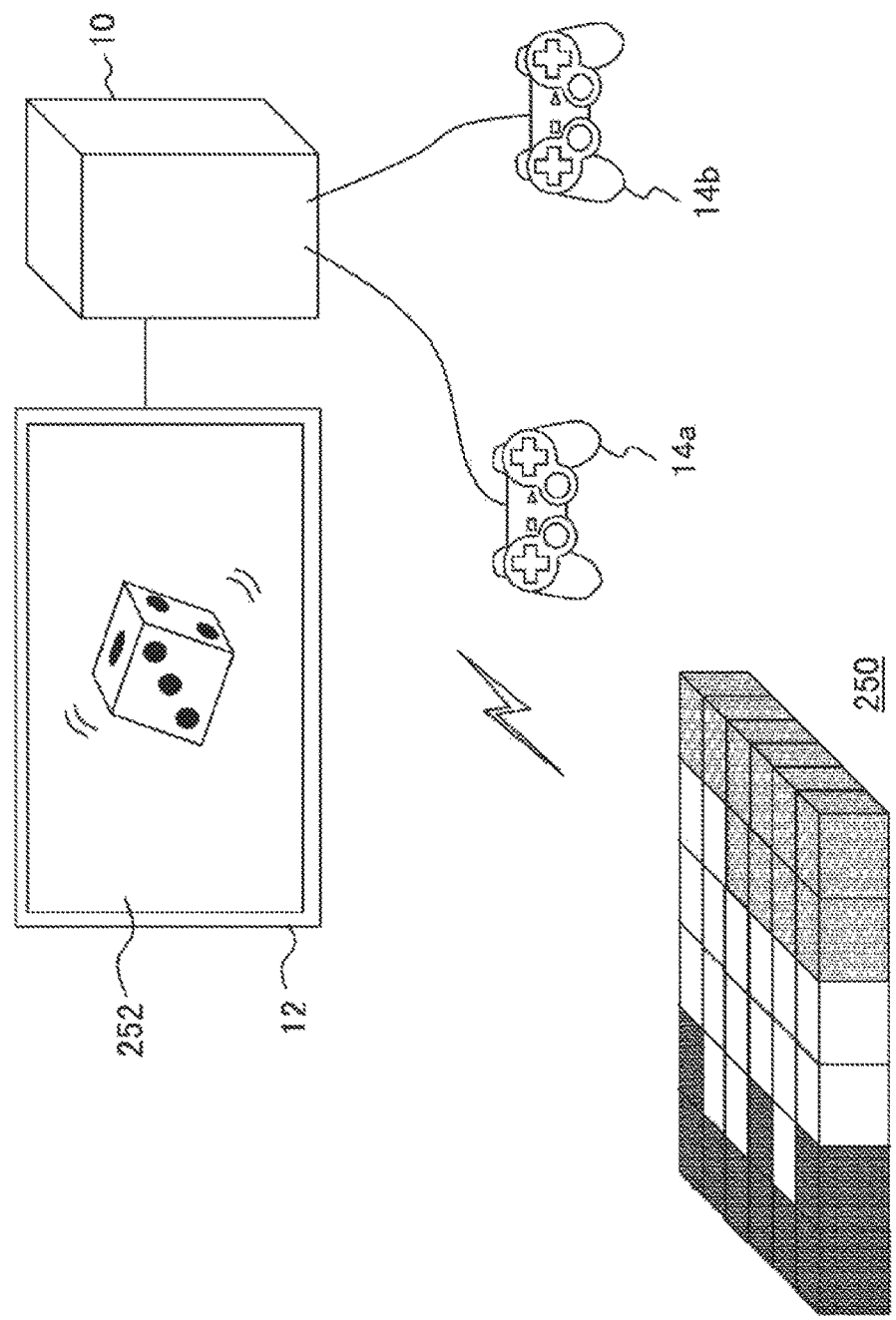

BLOCK, BLOCK SYSTEM, INFORMATION PROCESSING APPARATUS, DISPLAY METHOD, AND INFORMATION PROCESSING METHOD

TECHNICAL FIELD

The present invention relates to blocks that are assembled to form a solid object, a block system applicable to these blocks, an information processing apparatus, a display method, and an information processing method.

BACKGROUND ART

Toys are conventionally known with which two or more blocks or parts are interconnected to assemble a solid object. For example, widely popularized are blocks having basic shapes such as cube and cuboid that can be assembled in accordance with user's idea without restriction and dedicated blocks and parts that are formed to assemble a presumed solid object in accordance with a design drawing.

SUMMARY

Technical Problem

Basically, the blocks and parts mentioned above each have a simple structure made of a mass of plastics or the like. Therefore, these blocks and parts may be provided at a low cost, but are limited in expressive information such as shape, size, and preset color, thereby making the application range of these blocks and parts narrow and making it difficult to expand the expressive world.

The present invention has been made in consideration of the problem mentioned above and intended to provide blocks and parts that are representative of various items of information and expressions while preventing the structures of these blocks and parts from getting complicated.

Solution to Problem

In order to solve the problem described above, one aspect of the present invention is related with a block. The block is assembled to form a solid object and includes a communication unit configured to transmit and receive a signal to and from a host terminal, and a display unit configured to change a form in accordance with a request received by the communication unit from the host terminal.

It should be noted that shapes of "block" may be complicated shapes that simulate the shapes of objects existing in the real world such as humans, animals, plants, and industrial products, in addition to such basic shapes as expressed as cubes, cuboids, spheres and other figures. The size of "block" is not restricted.

In another aspect of the present invention, there is provided a block system. The block system includes a block to be assembled to form a solid object, and a host terminal communicable with the block. The host terminal includes a display information transmission unit configured to transmit a request for changing a form of display in the block, and the block includes a display unit configured to change a form in accordance with the request from the host terminal.

In still another aspect of the present invention, there is provided an information processing apparatus. The information processing apparatus is communicable with a block to be assembled to form a solid object and includes an identification information reception unit configured to acquire identification information related with the block, the identification information being stored in the block, an information processing unit configured to determine change of a form of display in the block on the basis of the identification information, and a display information transmission unit configured to transmit a signal requesting for the determined change of the form of display to the block.

In yet another aspect of the present invention, there is provided a display method. The display method is executed by a block to be assembled to form a solid object and includes a step of having a host terminal with communication established acquire identification information related with own block stored in a memory; a step of receiving, from the host terminal, a request related with change of a form of display determined by the host terminal on the basis of the identification information, and a step of changing the form of display in a display unit in accordance with the request.

In still yet another aspect of the present invention, there is provided an information processing method. The information processing method is executed by an information processing apparatus communicable with a block to be assembled to form a solid object and includes a step of acquiring identification information related with the block, the identification information being stored in the block, a step of determining change of a form of display in the block on the basis of the identification information, and a step of transmitting a signal requesting for the determined change of the form of display to the block.

It should be noted that any combinations of the components described above and the translation of the expression of the present invention between a method, an apparatus, a system, a recording medium, and a computer program are also valid for the aspects of the present invention.

Advantageous Effect of Invention

According to the present invention, blocks and parts that can represent various pieces of information and expressions can be provided while preventing structures from getting complicated.

BRIEF DESCRIPTION OF DRAWINGS

FIG. 6 is a diagram illustrating one example of block display changes at the time of a tidying-up operation in the present embodiment.

FIG. 7 is a diagram illustrating one example of a data structure of a table stored in a registration information storage unit of the host terminal in the present embodiment.

FIG. 8 is a flowchart indicative of a processing procedure in which a block is made emit light in different colors by an owner in the present embodiment.

FIG. 15 is a diagram illustrating one example of a data structure of information set to a display contents setting screen by the user in the present embodiment.

FIG. 16 is a diagram illustrating a form in which information related with a solid object is shared by use of a network in the present embodiment.

FIG. 17 is a diagram illustrating a form in which blocks are combined with a computer game in the present embodiment.

DESCRIPTION OF EMBODIMENT

Figure 1:
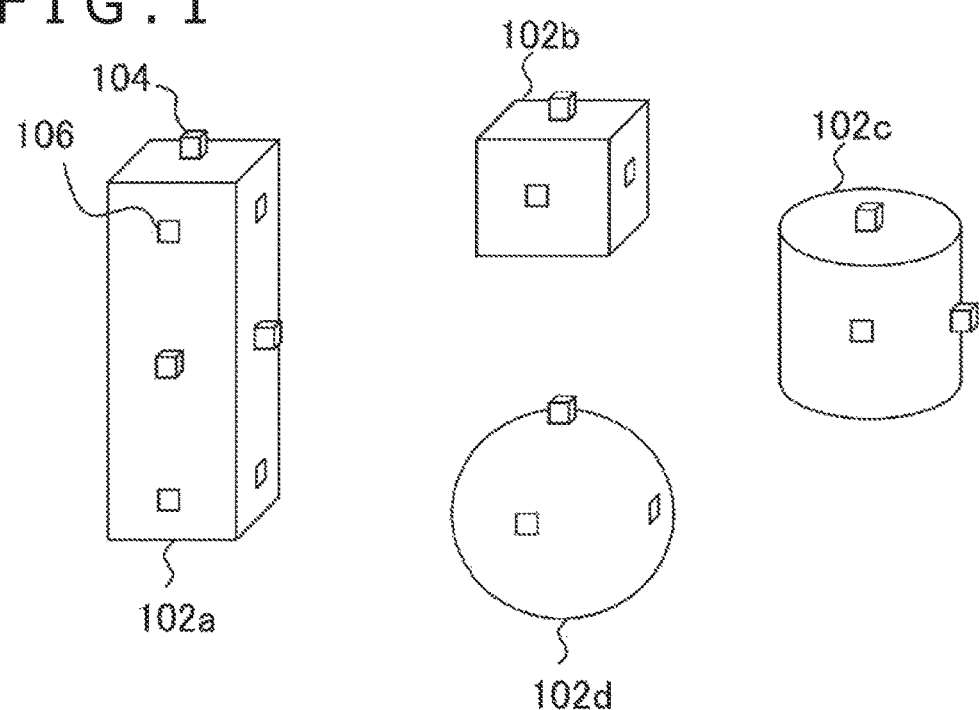
FIG. 1 is a diagram illustrating one example of external views of blocks in a present embodiment.

Now, referring to FIG. 1, there is shown one example of external views of blocks in the present embodiment. Blocks may take various forms, such as a quadratic prism block 102a, a cubic block 102b, a cylindrical block 102d, and a spherical block 102c. It should be noted that the block shapes are not limited to those mentioned above and may be of any sizes. For example, the blocks may take more complicated shapes, such as mechanical parts including supports, screws, and springs, and those which model after human head, hands, and feet. In what follows, these shapes are generically referred to as "blocks."

However, two or more shapes may not necessarily be included. In the figure, one block is indicated for one shape, but the number of blocks is not limited. Each block has a projecting part 104 and a recessing part 106 that have a predetermined size and a predetermined shape, the projecting part 104 being inserted in the recessing part 106 to configure these blocks at a desired position in a connectable manner. In addition, the rotation of a joint block may change the positions and posture of the connected blocks.

Figure 2:
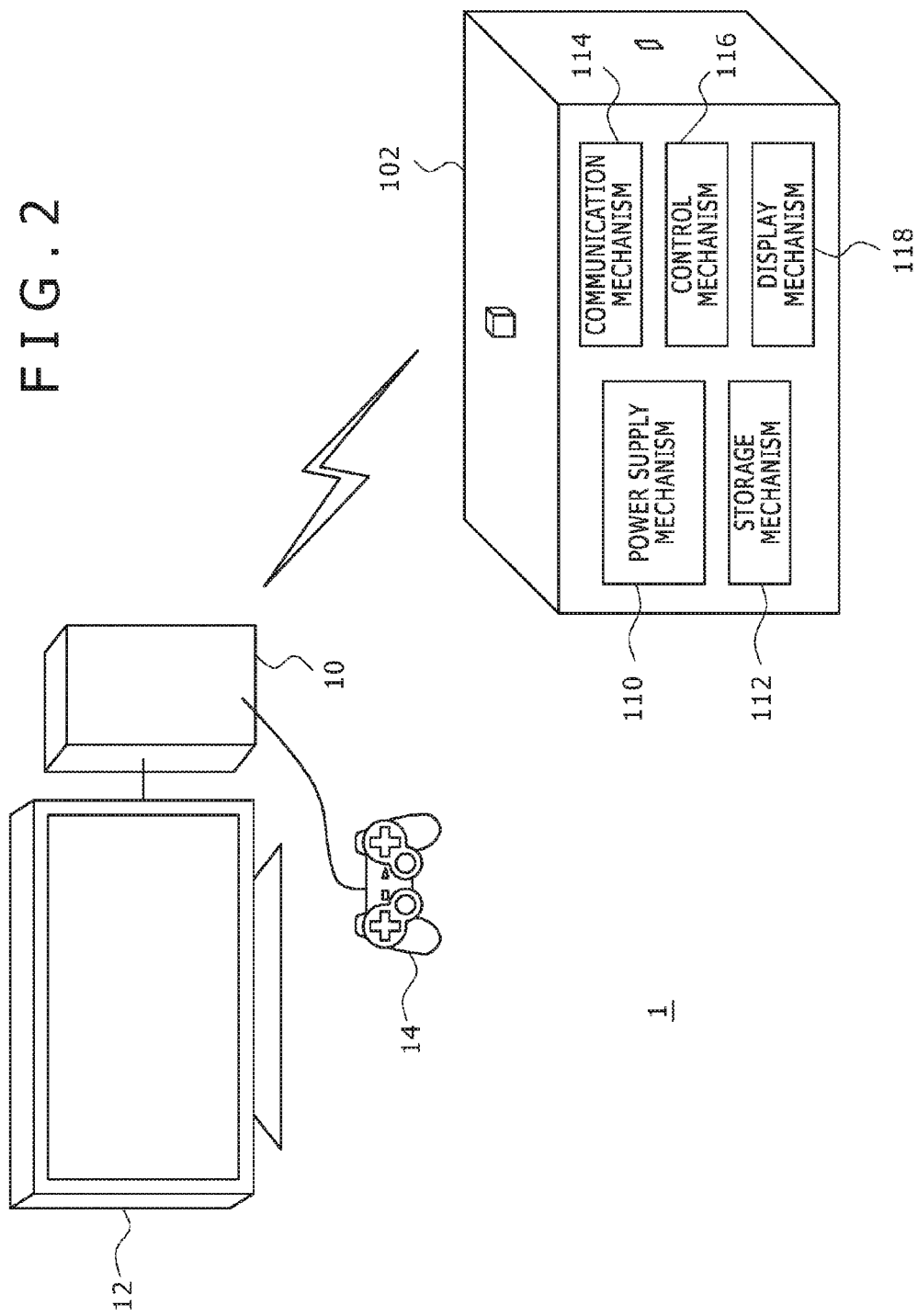
FIG. 2 is a schematic view of a system and an internal structure of a block practiced as one embodiment.

Referring to FIG. 2, there is schematically shown a system and an internal structure of a block of the present embodiment. A block system 1 includes a block 102 and a host terminal 10. As described above, there is no restriction on the shapes and the number of blocks; here, these blocks are generically referred to as the block 102. The block 102 includes a power supply mechanism 110, a storage mechanism 112, a communication mechanism 114, a control mechanism 116, and a display mechanism 118.

The power supply mechanism 110 supplies power to the block 102 by use of a general technique such as getting power from a general battery or from a separately arranged power supply in a wired or a wireless manner. The communication mechanism 114 establishes connection with the host terminal 10 in a wired or wireless manner to transmit and receive various signals. The storage mechanism 112 is a memory for storing identification information related with each block 102.

The display mechanism 118 is realized by an element or a set of elements having a function of emitting lights of multiple colors, such as a light-emitting diode, a light-emitting element, a liquid crystal display, an organic EL display, and an electronic paper and, under the control by the host terminal 10, emits light or displays images. The control mechanism 116 is realized by a microcomputer or the like and executes programmed processing in accordance with signals received from the host terminal 10. Then, the control mechanism 116 controls the communication mechanism 114, the storage mechanism 112, the display mechanism 118, and the power supply mechanism 110 as required.

In the present embodiment, the host terminal 10 acquires the identification information stored by the block 102 into the storage mechanism 112. On the basis of the acquired identification information, the host terminal 10 determines the contents of display to be executed by the block 102 concerned and notifies the block 102 of the determined display contents. The control mechanism 116 of the block 102 receives this notification via the communication mechanism 114 and changes the displays in the display mechanism 118 on the basis of the received notification. For example, for each block owner, the block is made emit light in a different color. In this case, the host terminal 10 discriminates the owner of each block on the basis of the information with the individual identification information of the block 102 related with the identification information of that owner.

Next, each block is made emit light in a different color determined for each owner. This setup allows two or more users, for example, to discriminate own block from the blocks of others in doing tidying-up after playing blocks by bringing their blocks to one place and assembling these blocks into one object or mixing these blocks. Thus, in addition to making the light-emitting diode emit light in a color requested by the host terminal 10, the display mechanism 118 may display a requested image onto the own display. In what follows, these processing operations may be collectively referred to as "display." Further, simple description "light emission" may be replaced by "image display."

If light-emission colors are used, at least a part of the housing of the block 102 is formed with transparent or translucent resin or glass so as to make the light emission of the internal diode visible from the outside. Also, the display mechanism 118 may have two or more mono-color or multi-color diodes, thereby making the block 102 locally emit light or emit light in different colors depending upon locations. If an image is shown on the display, then the image may be any one of an image entirely mono color painted, an image locally having luminance, and an image regionally different in color. Alternatively, the image may be a general still image or moving image representative of some object, pattern, or letter.

The host terminal 10 may be a game machine or a personal computer, for example and realizes information processing functions by loading necessary application programs. The host terminal 10 is connected to a display apparatus 12 and an input apparatus 14 in a wired or wireless manner. The display apparatus 12 may be a general display, such as a liquid crystal display, a plasma display, or an organic EL display. The display apparatus 12 may be a television receiver having one of these displays and a speaker. The input apparatus 14 may be any one of general input apparatuses, such as a game controller, a keyboard, a mouse, a joy stick, a touch pad on the screen of the display apparatus 12 or a combination thereof.

Figure 3:
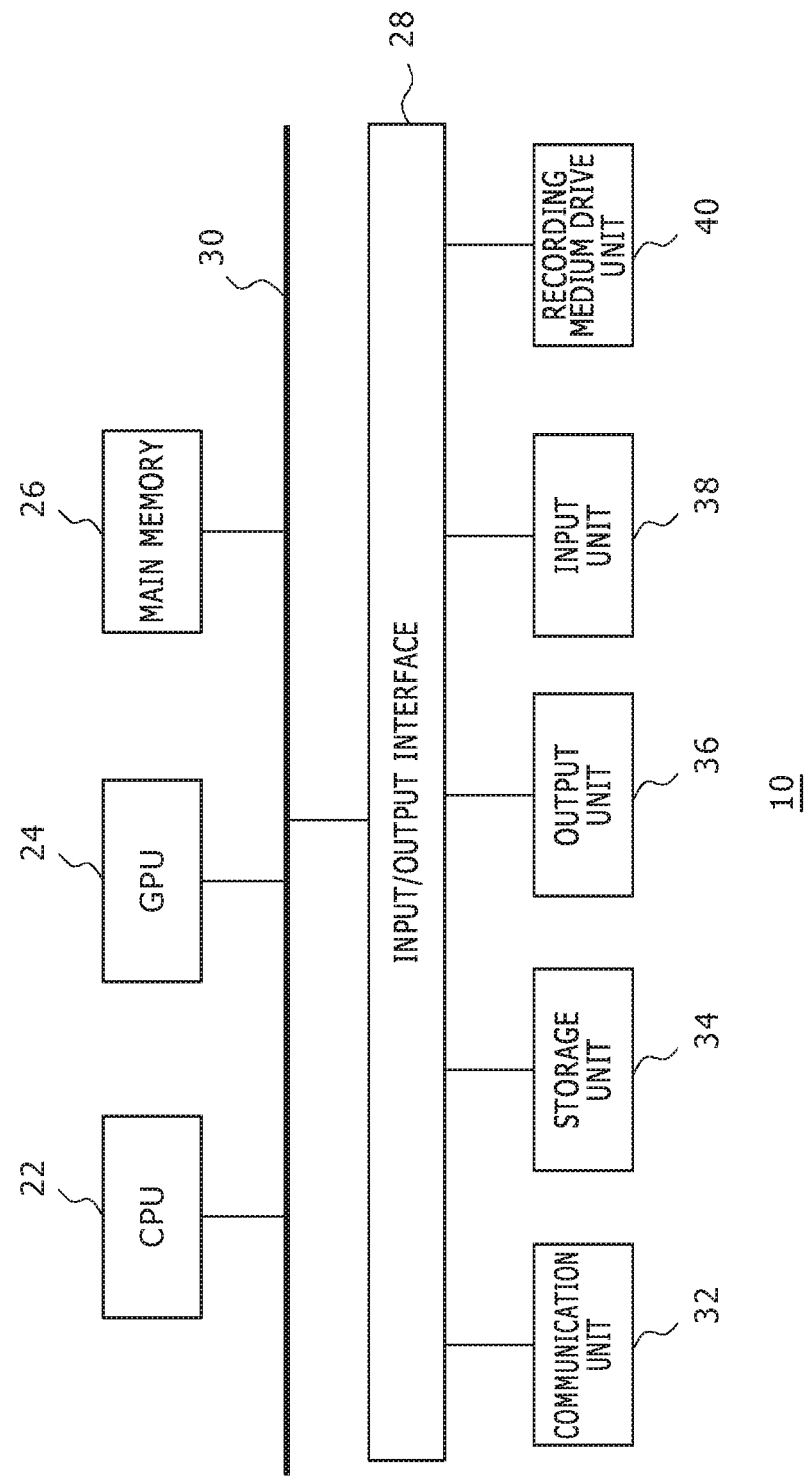
FIG. 3 is a diagram illustrating an internal circuit configuration of a host terminal in the present embodiment.

Referring to FIG. 3, there is shown an internal circuit configuration of the host terminal 10. The host terminal 10 includes a CPU (Central Processing Unit) 22, a GPU (Graphics Processing Unit) 24, and a main memory 26. The CPU 22 controls the processing and signal transmission in components inside the host terminal 10 on the basis of programs such as an operating system and applications. The GPU 24 executes image processing. The main memory 26 made up of a RAM (Random Access Memory) stores programs and data necessary for the processing.

The components mentioned above are interconnected through a bus 30. An input/output interface 28 is further connected to the bus 30. Connected to the input/output interface 28 are a communication unit 32 made up of a peripheral device interfaces such as USB and IEEE1394 and a network interface such as wired or wireless LAN, a storage unit 34 such as a hard disk drive or a nonvolatile memory, an output unit 36 for outputting data to output apparatuses such as the display apparatus 12 and a speaker, an input unit 38 through which data is entered from the input apparatus 14, and a recording medium drive unit 40 for driving a removable recording medium such as a magnetic disc, an optical disc or a semiconductor memory.

The CPU 22 controls the entire host terminal 10 by executing the operating system stored in the storage unit 34. In addition, the CPU 22 executes various kinds of programs read from a removable recording medium and loaded in the main memory 26 or downloaded through the communication unit 32. The GPU 24 has a geometry engine function and a rendering processor function, executes drawing processing in accordance with drawing instructions given by the CPU 22, and stores a resultant display image into a frame buffer, not shown. Then, the GPU 24 converts the display image stored in the frame buffer into a video signal and outputs the video signal to the output unit 36 and so on.

Figure 4:
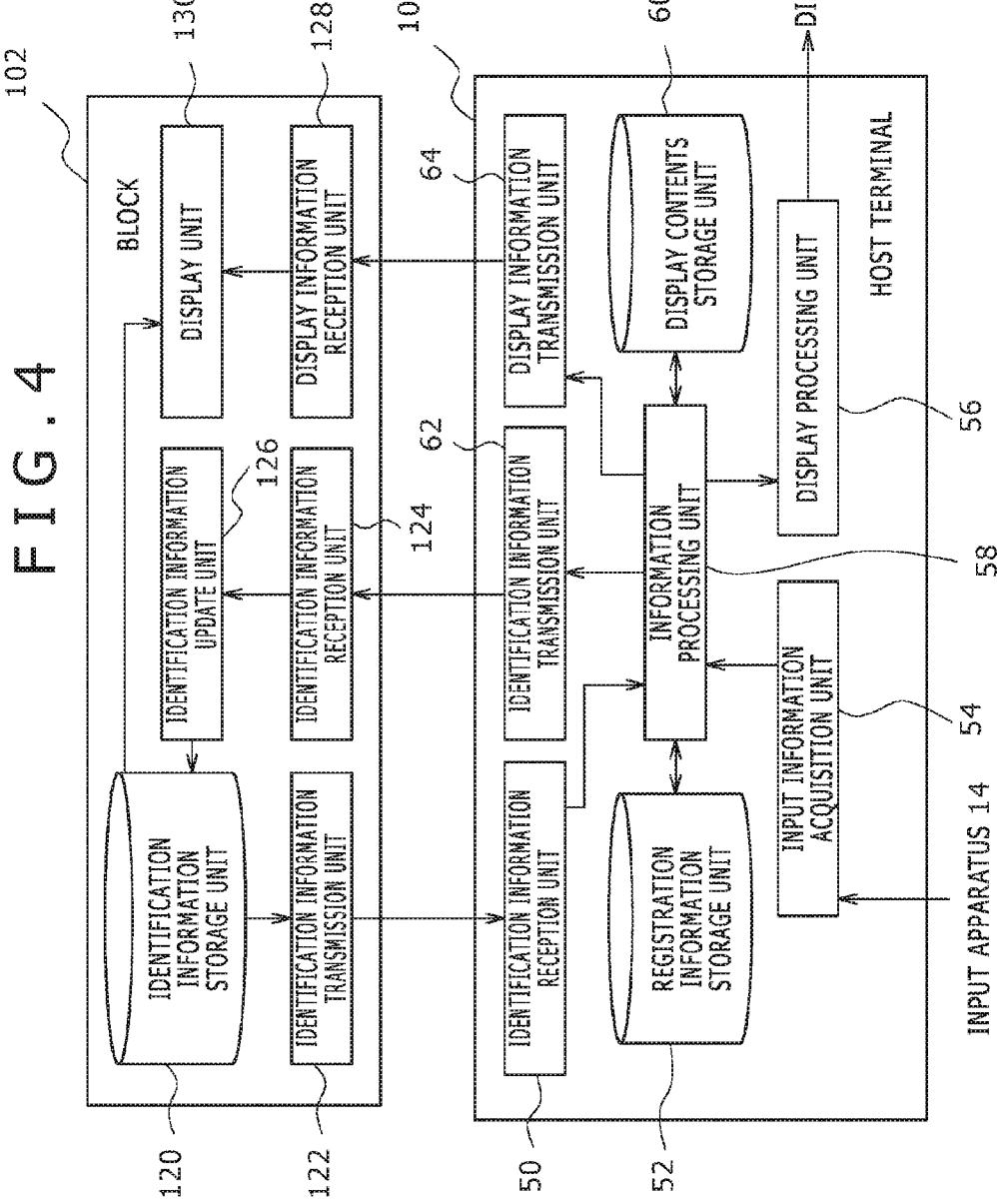
FIG. 4 is a diagram illustrating a configuration of functional blocks of the block and the host terminal in the present embodiment.

Referring to FIG. 4, there is shown a configuration of functional blocks of the block 102 and the host terminal 10. Each of the functional blocks shown in FIG. 4 can be realized by the configurations of the various mechanisms and the various processors such as CPU, GPU, and RAM shown in FIG. 2 and FIG. 3 in the hardware approach; in the software approach, the functional blocks are realized by the programs loaded from the storage unit 34 and the recording medium via the recording medium drive unit 40 into the main memory 26 and programs stored in a microcomputer. Therefore, it is understood by those skilled in the art that these functional blocks can be realized by a hardware alone, a software alone, or a combination of them and are not limited to any one thereof.

The block 102 includes an identification information storage unit 120 for storing identification information related with the block, an identification information transmission unit 122 for transmitting the identification information concerned to the host terminal 10 as required, an identification information reception unit 124 for receiving the identification information transmitted from the host terminal 10 and related with the block, an identification information update unit 126 for updating the information stored in the identification information storage unit 120 on the basis of the received identification information, a display information reception unit 128 for receiving the information transmitted from the host terminal 10 and related with display contents, and a display unit 130 for displaying the received contents.

The host terminal 10 includes an identification information reception unit 50 for receiving the identification information related with the block from the block 102, an input information acquisition unit 54 for acquiring information entered by the user through the input apparatus 14, a display processing unit 56 for executing processing for displaying the information necessary for entering and the information related with the block onto the display apparatus 12, an information processing unit 58 for controlling each functional block of the host terminal 10, an identification information transmission unit 62 for transmitting the identification information related with the block to the block 102, a display contents storage unit 60 for storing data indicating contents to be displayed by the block 102, and a display information transmission unit 64 for transmitting the information related with the contents to be actually displayed to the block 102.

The identification information storage unit 120 of the block 102, realized by the storage mechanism 112 shown in FIG. 2, stores the information for identifying the individuality of the block 102. This identification information may include identification information that is unique to all blocks and identification information that is common to all blocks having the same shape. These pieces of identification information that are original to blocks are given at a manufacturing process for example and stored in a nonvolatile memory such as the ROM (Read Only Memory) that makes up the storage mechanism 112.

The identification information storage unit 120 may further store the identification information of the owner of the block 102 concerned. The owner identification information is basically allocated to each user by the host terminal 10 and transmitted to the block 102. This identification information is received by the identification information reception unit 124 to be stored by the identification information update unit 126 into the identification information storage unit 120. The identification information storage unit 120 may additionally store the identification information of the group to which the owner belongs and the groups of interconnected blocks. These pieces of identification information are given by the host terminal 10 as required and transmitted to the block 102. Thus, the identification information given by the host terminal 10 is stored in a volatile memory such as the RAM (Random Access Memory) that makes up the storage mechanism 112.

It should be noted that the owner identification information and the identification information of the group to which the owner belongs and the groups of interconnected blocks may be stored in a non-volatile memory. This setup allows, if the blocks of users registered at different host terminals are mixed, the sharing of information by use of a network or the like and the discrimination between owners by light-emission colors for example without registering the users at the host terminal again every time the blocks are used.

"Identification information related with the block" for use in transmission and reception with the host terminal 10 may be any one of the identification information that is original to the block and the identification information given by the host terminal 10. The identification information transmission unit 122 is realized by the communication mechanism 114 shown in FIG. 2 and reads the identification information related with the block from the identification information storage unit 120 at a necessary timing such as tidying-up, transmitting this identification information to the host terminal 10. For example, if the communication is realized by a near-distance wireless communication technology using an RF tag, the user himself or herself generates "necessary timing" by passing the block 102 over a reader/writer connected to the host terminal 10.

In this case, the function of the identification information reception unit 50 of the host terminal 10 is realized by this reader/writer and the identification information related with the block is recognized by the host terminal 10. It should be noted that, if the host terminal 10 gives an identification number, this reader/writer can be used. Namely, the function of the identification information transmission unit 62 of the host terminal 10 is realized by the reader/writer and the identification information given by the host terminal 10 is recognized by the block 102 by passing the block 102 over the reader/writer.

The display information reception unit 128 of the block 102 is realized by the communication mechanism 114 shown in FIG. 2 and gets the information about a light-emission color and an image to be displayed from the host terminal 10. The display unit 130 is realized by the control mechanism 116 and the display mechanism 118 shown in FIG. 2 and, on the basis of the information acquired by the display information reception unit 128, makes a light-emitting diode emit light and displays an image onto the display. In displaying an image onto the display, the image data concerned may be acquired from the host terminal 10 on an as required basis or may be held inside the display unit 130. In this case, the identification information of the image to be displayed is also acquired from the host terminal 10. If a light-emitting diode is made locally emit light, the information indicative of a light-emission color and a region to be made emit light and the information with the region and light-emission color related with each other.

The identification information reception unit 50 and the identification information transmission unit 62 of the host terminal 10 are realized by the communication unit 32 shown in FIG. 3. As described above, the identification information reception unit 50 receives the identification information related with the blocks held in the block 102 and the identification information transmission unit 62 transmits the identification information given by the host terminal 10 to the block 102. The information processing unit 58 is realized by the CPU 22, the GPU 24, and the main memory 26 and so on shown in FIG. 3 and determines a light-emission color of the block and an image to be displayed on the block. The colors to be allocated and the image data are stored in the display contents storage unit 60 in advance to be referenced as required.

If it is necessary to identify such information given by the host terminal 10 as the identification information original to the block, the identification information of the owner and so on, the information processing unit 58 references a table in which these pieces of information are correlated, the table being stored in the registration information storage unit 52. The display contents storage unit 60 and the registration information storage unit 52 are realized by the main memory 26, the storage unit 34, and so on. It should be noted that at least part of the information to be stored in the display contents storage unit 60 and the registration information storage unit 52 may be stored in a server connected via a network to be acquired from this server as required.

Further, as will be described later, the information processing unit 58 may acquire a state of a solid object halfway in assembly and execute processing of explicitly indicating the information related with an assembly procedure corresponding to the steps of the assembly by the display on the display apparatus 12 or the light emission of the block. In addition, when the user has executed the setting of the display contents such as block light-emission colors through the input apparatus 14, this information may be stored in the display contents storage unit 60. Further, the user may execute various information processing operations such as a game requested by the user through the input apparatus 14 and execute the processing for reflecting the results of these processing operations onto the displays of the display apparatus 12 and the block 102.

The display information transmission unit 64 is realized by the communication unit 32 shown in FIG. 3 and transmits signals for requesting the light emission and image display in the contents determined by the information processing unit 58 to the block 102. At this moment, the display information transmission unit 64 may transmit the identification information related with the block 102 and the information about the determined display contents to all blocks 102 by relating these pieces of information with each other. Receiving these pieces of information, the block 102 references the own identification information stored in the identification information storage unit 120 and, if the block is found to be the requested target, changes the display on the display unit 130 as requested. However, if the signals can be transmitted and received with individual blocks through connection with cables for example, the display information transmission unit 64 may transmit a request signal only to the block that is the requested target.

It should be noted that, with respect to methods of how the owner determines display contents in accordance with types of identification information and display contents in accordance with types of rules various approaches are possible depending upon purposes of changing the displaying of the block. The input information acquisition unit 54 is realized by the input unit 38, the input/output interface 28, and so on shown in FIG. 3 and supplies the contents of operations performed by the user through the input apparatus 14 to the information processing unit 58. These operations include command inputs for such information processing to be executed by the information processing unit 58 as processing start and end requests, registration of block owner, display setting like light-emission color of the block, and gaming.

In accordance with requests by the information processing unit 58, the display processing unit 56 displays images necessary for owner registration and display setting of the block onto the display apparatus 12. For example, in registering the owner of the block 102, icons of two or more users already registered in the host terminal are displayed on the display apparatus 12. The user who is the owner executes an input operation of selecting the own icon in the screen through the input apparatus 14 with the block 102 held over the reader/writer. In response to this, the information processing unit 58 relates the block identification information read from the block 102 with the identification information of the user concerned and stores the related information into the registration information storage unit 52, thereby performing owner registration.

In addition, the display processing unit 56 may display the information related with a block assembly sequence and the like onto the display apparatus 12. Details being described later, putting correlation between the displaying on the display unit 130 of the block 102 and the displaying of the display apparatus 12 allows the relation of the actual object of the block with the image of the block being displayed, thereby providing a variety of pieces of information. Further, the display processing unit 56 may display a screen of a game executed by the information processing unit 58, and so on. In any case, the image data necessary for displaying is stored in the display contents storage unit 60 in advance.

Figure 5:
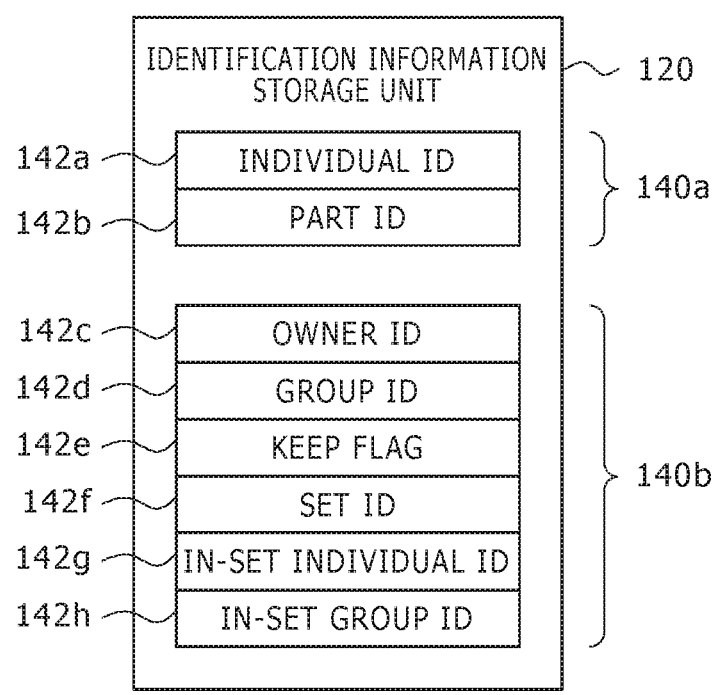
FIG. 5 is a diagram illustrating one example of a structure of a storage area in an identification information storage unit of the block of the present embodiment.

Referring to FIG. 5, there is shown an example of a structure of a storage area in the identification information storage unit 120 of the block 102. The identification information storage unit 120 includes a read-only storage area 140*a* made up of a nonvolatile memory and a read/write-enabled storage area 140*b* made up of a volatile memory or a nonvolatile memory. The read-only storage area 140*a* is arranged with an "individual ID" storage area 142*a*, the "individual ID" being identification information unique to a block, and a "part ID" storage area 142*b*, the part ID being identification information about each shape. If block owners are different, the same "part ID" is given to the block having the same shape, thereby allowing the sharing of the configurational information of a solid object assembled and formed with blocks between other users and block makers.

The read/write-enabled storage area 140*b* is arranged with an "owner ID" storage area 142*c* which is identification information of the owner described above and a "group ID" storage area 142*d* which is identification information of a group to which the owner belongs. The "group ID" is the information for identifying a club to which the owner belongs and the school class for example and usable at the time of tidying-up like the owner.

The storage area 140*b* is additionally arranged with a "keep flag" storage area 142*e*, a "set ID" storage area 142*f*, an "in-set individual ID" storage area 142*g*, and an "in-set group ID" storage area 142*h*. The "keep flag" indicates, when two or more users assemble blocks at one location, a flag for assuring the blocks that each user wants to use for assembly. For example, each user executes an input operation of setting up a flag on the host terminal 10 with the target block held over the reader/writer.

Then, the host terminal 10 transmits a request for updating the flag value stored in the "keep flag" storage area 142*e* from "0" to "1" from the identification information transmission unit 62 to the block 102. When the identification information reception unit 124 of the block 102 receives this request, the value of the "keep flag" storage area 142*e* is updated by the identification information update unit 126. Detecting that the value in the "keep flag" storage area 142*e* has been updated to "1," the display unit 130 makes the diode emit light in a color allocated to this flag in advance. It is also practicable for the host terminal 10 to otherwise transmit a request for making the block for which the flag is set up emit light.

The above-mentioned configuration allows each block to be assured to emit light in a predetermined color, thereby preventing, if a block to be used is shared by two or more users, the use of the target block by other users unnoticeably. The blocks assured by owners may be grouped by color by determining a color by a combination with the owner ID. If there is no possibility for the block to be used by others because the block is connected to another block, for example, the user may operate the host terminal 10 again to update the keep flag from "1" to "0," thereby stopping light emission from the block 102. Alternatively, a configuration may be provided in which a block itself detects the connection so as to stop light emission by itself.

The "set ID" is identification information unique to a solid object completed by assembling blocks; the same identification information is given to the two or more blocks that make up this solid object. The "in-set individual ID" is information for identifying each block inside the solid object concerned. The "in-set group ID" is identification information in units of groups in which the blocks making up the solid object concerned are grouped in predetermined units such as parts of the solid object. The "set ID," the "in-set individual ID," and the "in-set group ID" can be used when, after creating a solid object by freely assembling blocks, this solid object and the configuration thereof are managed.

It should be noted that the structure of the storage area of the identification information storage unit 120 shown in FIG. 5 is illustrative only; it is also practicable to store data only in a part of the area as required or arrange another information storage area. Alternatively, the identification information storage unit 120 may have only the read-only storage area 140*a*. For example, only the "individual ID" storage area 142*a* may be arranged on each block and all the other information may be stored in the registration information storage unit 52 of the host terminal 10 by relating the information with the "individual ID." Then, the host terminal 10 side may determine the information about the display contents for the "individual ID" of the block on the basis of the attribute of each block, thereby transmitting a request signal thereof to each block. This configuration allows the manufacturing cost of each block itself to be reduced. On the other hand, according to a form in which necessary information is written on the block itself beforehand, appropriate display control can be provided independently of the host terminal.

Referring to FIG. 6, there is shown block display changes at the time of tidying-up for example. The upper in the figure is a solid object 150*a* made up of the assembly of blocks and composed of eight blocks. These blocks are brought by two or more owners; if these blocks are the same in external view as with the solid object 150*a*, it is difficult for each owner to determine which of these blocks is to be taken home after disassembly. In the present embodiment, the owner ID is stored in each block at the time of starting assembly for example and, at the time of tidying-up, each block is made emit light in a different color for each owner ID. Consequently, each owner can specify his or her own block.

The lower of FIG. 6 is indicative of a solid object 150*b* that is emitting light at the time of tidying-up in which the blocks having different paint patterns is indicative of different light-emission colors. This light emission allows easy recognition of that a block 152*a*, a block 152*b*, and a block 152*c* are those of one owner, a block 154*a*, a block 154*b*, and a block 154*c* are those of another owner, and a block 156*a* and a block 156*b* are those of still another owner. The correlation between light-emission color and each owner may be registered along with the registration of the owner ID on the blocks by the owner himself or herself or allocated by the host terminal 10. In the latter, the correlation may be set so that the correlation can be known by relating the light-emission color with each owner icon and displaying this correlation on the display apparatus 12, for example.

If each block itself stores the owner ID as shown in FIG. 5, the host terminal 10 transmits a light-emission request including information with each owner ID related with each light-emission color to be allocated to each owner ID from the display information transmission unit 64 to all blocks. The display unit 130 of each block 102 acquires the owner ID of the own block from the identification information storage unit 120 and makes the light-emitting diode emit light in a color related with this owner ID. On the other hand, if the block 102 does not store the owner ID, then the host terminal 10 gets each owner ID from the individual ID obtained from the block 102.

For this purpose, a table in which block individual IDs and owner IDs are related with each other is stored in the registration information storage unit 52 of the host terminal 10. FIG. 7 shows one example of a data structure of the table stored in the registration information storage unit 52 of the host terminal 10 in this case. An owner ID table 160 includes an individual ID column 162*a* and an owner ID column 162*b*. An individual ID that is identification information unique to a block or a range thereof are written to the individual ID column 162*a*. This individual ID corresponds to the individual ID stored in the identification information storage unit 120 of the block 102.

An owner ID that is identification information of an owner of a block having an individual ID listed in the individual ID column 162*a* is written to the owner ID column 162*b*. In the example shown in the figure, 50 blocks having individual IDs "0001" through "0050" are owned by an owner having an owner ID "AAA." 50 blocks having individual IDs "0051" through "0100" are owned by an owner having an owner ID "BBB." 50 blocks having individual IDs "0101" through "0150" are owned by an owner having an owner ID "CCC."

If the owner IDs are managed by the host terminal 10 side, then the host terminal 10 gets the individual IDs of the blocks to be tidied up and references the owner ID table 160 on the basis of the acquired individual IDs, thereby acquiring the owner ID of each block. Next, the host terminal 10 allocates light-emission colors to the owners and transmits a light-emission request to each block by relating the allocation with the individual ID of each block. The display unit 130 of each block 102 gets the individual IDs of the own blocks from the identification information storage unit 120 and makes the light-emitting diode emit light in the corresponding color. It should be noted that, if a block has a display, then the initial or a symbol mark of each owner may be displayed instead of mono-color light emission.

The following describes an example of operations to be realized by the block 102 and the host terminal 10 in the configuration described above. Referring to FIG. 8, there is shown a processing procedure for making blocks emit light in colors different from owner to owner at the time of tidying-up for example in the present embodiment. It is assumed in advance that the owner ID be written to the block 102 or the block individual ID be related with the owner ID in the host terminal 10. It should also be noted that the block 102 is not limited to one unit but at least one of two or more blocks to be tidied up.

First, in the block 102, whether a situation in which tidying-up is to be started has occurred or not is monitored (S10). Such a situation occurs when the user passes the block to be tidied up over the reader/writer or presses a button for entering tidying-up start request arranged on the block, for example. Until such a situation occurs, monitoring is continued (N of S10). If such a situation occurs (Y of S10), a notification that tidying-up is to be started is transmitted from the block 102 to the host terminal 10 (S12). Actually, this notification may be the processing in which the identification information transmission unit 122 of the block 102 transmits the identification information related with the block to be tidied up; if the block is passed over the read/writer in step S10, the processing of S12 is executed at the same time.

Obviously, communication may be established between the block 102 and the host terminal 10 separately in S12, thereby transmitting signals in a wireless or wired manner. Then, the information processing unit 58 of the host terminal 10 gets the owner ID of each block on the basis of the transmitted information (S14). As described above, the owner ID may be transmitted directly from the block 102 or the host terminal 10 may identify the owner ID on the basis of the individual ID transmitted from the block 102. Next, another light-emission color may be allocated to each owner (S16), thereby transmitting allocation results to the block 102 through the display information transmission unit 64 (S18).

It should be noted that, if the owner sets a light-emission color of the own block in advance, then the preset color is related with the owner ID and the related preset color and owner ID are stored in the display contents storage unit 60 in advance, which are read in S16. It should also be noted that the information to be transmitted in S18 is different depending upon the information stored in the block 102 as described above. Namely, if the block 102 stores the owner ID, then the information with this owner ID related with the light-emission color is transmitted; if the block 102 does not store the owner ID, then the information with the individual ID related with the light-emission color is transmitted.

Anyway, the display unit 130 of the block 102 gets the owner ID or the individual ID from the identification information storage unit 120 and identifies, of the information transmitted from the host terminal 10, the color allocated to the own block, thereby starting light emission in the identified color (S20). By following the processing procedure, such display changes as shown in FIG. 6 are acquired.

It should be noted that a light-emission color itself may be stored in each block as with an owner ID for example. Namely, like an owner ID, the information about the light-emission color set to the host terminal 10 in advance by the user is transmitted to the block 102 to be stored in the identification information storage unit 120 in advance. Arranging a button for entering a tidying-up start request onto the block allows the realization of the display change as indicated in FIG. 6 only by pressing this button at the time of tidying-up without communication with the host terminal 10. Alternatively, at the time of starting tidying-up, the user may enter the information about the start of tidying-up on the host terminal 10. In this case, giving a light-emission request involved in tidying-up from the host terminal 10 to the block 102 allows the realization of light emission by the processing inside the block 102.

In the form in which each block is made emit light in a color different from owner to owner as shown in FIG. 6, how a solid object is assembled, namely, the relation of connection between the blocks is not related with the light-emission processing. Namely, the same processing is executed if the blocks are assembled or the blocks are not interconnected. On the other hand, if a configuration in which the relation of connection between the blocks is understood by the host terminal 10 is employed, then a block assembly sequence may be indicated to the user and the colors may be changed for each part in the assembled solid object for the purpose of decoration for example.

For the host terminal 10 to understand the relation of connection between the blocks, the projecting part 104 and the recessing part 106 are given the roles of terminals for signal transmission between the blocks in the blocks shown in FIG. 1 in the present embodiment. For this purpose, the tops of these parts are formed with connectors having structures in accordance with the standard of a bus arranged inside each block. Employing generally available connectors of various types or dedicated special connectors allows the achievement of signal transmission and the physical linking between blocks at the same time. Each terminal is given an identification number unique inside each block, by which the position of connection with other blocks, namely, the joint position is identified.

In this case, the communication mechanism 114 of the block 102 may have a wired communication mechanism for transmitting and receiving signals with other blocks via a connection terminal and a mechanism for executing wireless communication with the host terminal 10. However, the communication mechanism 114 of some blocks may be configured only by the wired communication mechanism for transmitting and receiving signals with other blocks. These blocks are used in combination with blocks that are communicable with the host terminal 10. In order to prevent information complication, the block that establishes communication with the host terminal 10 is basically only one among the blocks making up one solid object. Namely, this block is given the role of a hub. Then, information is transmitted from the blocks whichever is farther from this block in connection relation, thereby making the block playing the role of a hub to collect the information about the entire solid object.

In what follows, a block relatively nearer the block playing the role of hub in block connection is "upper" while a block relatively farther from the hub block is "lower." The block to which the role of hub is given may be specified to be one unit in advance or a switch or the like may be arranged on the block having the mechanism for communication with the host terminal 10 to give the role of hub to the block turned on by the user. Alternatively, the role of hub may be given to the block that first establishes communication with the host terminal 10 at the stage of assembly.

Each block receives information transmitted from the directly connected lower blocks. The information received here includes the individual ID of the block connected lower than the block concerned and the identification number of the joint position. If two or more blocks are connected to each other, the information is added every time blocks are passed starting with the lowest block. The block having the role of hub adds own information to the information of the other blocks sequentially added from the lower blocks and transmits the accumulated information to the host terminal 10. The host terminal 10 acquires, for each solid object, the collected information transmitted from the block having the role of hub.

Figures 9, 10:
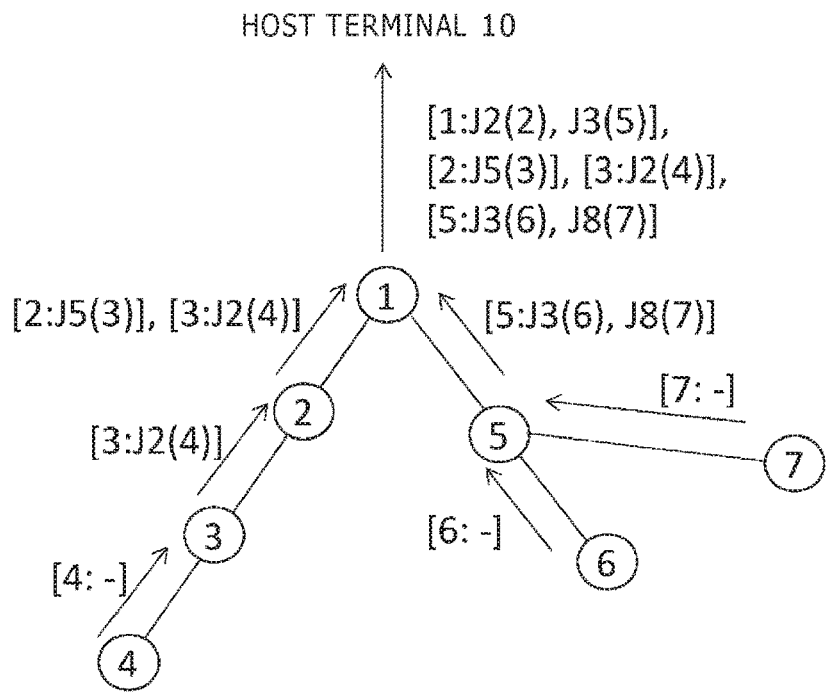
FIG. 9 is a schematic view of one example of an information transmission route in a solid object configured by two or more blocks and information to be transmitted in the present embodiment.
FIG. 10 is a diagram illustrating one example of a structure of data to be stored in the registration information storage unit of the host terminal in order to identify a block junction relation in the present embodiment.

Referring to FIG. 9, there are schematically shown an example of an information transmission route in a solid object configured by two or more blocks and information to be transmitted. On an information transmission route 170, each circle with a number written inside is indicative of a block and lines between the circles are each indicative of a state that blocks are linked with each other. The number in each circle is also indicative of an individual ID of each block. In the figure, a block having an individual ID "1" has the role of hub and establishes communication with the host terminal 10.

In the example shown in the figure, the block having the individual ID "1" is connected to a block having an individual ID "2" and a block having an individual ID "5." The block having the individual ID "2" is connected to a block having an individual ID "3" and a block having an individual ID "4" in series in this order. The block having the individual ID "5" is connected to a block having an individual ID "6" and a block having an individual ID "7" in parallel.

As described above, information transmission is basically executed from lower blocks to upper blocks. In FIG. 9, the contents of the information to be transmitted are indicated along with arrows indicative of transmission directions. For example, the information to be transmitted from the block having the individual ID "3" to the block having the individual ID "2" is indicated as [3:J2(4)]. This indicates that the signal is configured by a format of "own individual ID: identification number of joint position arranged on block (individual ID of block connected there)" and that the block having the individual ID "4" is connected to the position having an identification number "J2" of joint positions having the individual ID "3." It should be noted however that this figure does not limit the information format and the information contents.

The direction of the upper position of a block can be determined by the block having the role of hub searching a network made up of block joints for sequencing. This procedure can be realized by a networking technology in a device tree making up a general information processing system.

In FIG. 9, the block having the individual ID "4" is located at the bottom in the joint series to which this block belongs, so that this block transmits information to the block having the individual ID "3" one step higher. Since no block is connected below to the block having the individual ID "4," the information to be transmitted is only own individual ID "4" and the transmitted contents are represented by "[4:-]" in the figure. "-" is indicative that there is no block connected below.

Receiving a signal from the individual ID "4," the block having the individual ID "3" relates the number of the terminal that received this signal with the signal as the identification number of the joint position and own individual ID "3" with this signal, transmitting the related signal to the block having the individual ID "2" one step higher. The contents of the transmission of this signal is [3:J2(4)] as described above. Likewise, the block having the individual ID "2" generates a signal, namely, [2:J5(3)], related with the own individual ID, the joint position identification number ("J5" in the example in the figure), and the individual ID "3" of the connected block.

The block having the individual ID "2" transmits the data thus generated and the data transmitted from the lower block, namely, [3:J2(4)], to the block having the individual ID "1" one step higher. However, these signals need not be transmitted always at the same time; it is practicable to transmit only the information about the change, if any, in the signal contents once transmitted. On the other hand, the blocks having the individual IDs "6" and "7" connected to the block having the individual ID "5" transmit signals [6:-] and [7:-] to the block having the individual ID "5" as with the block having the individual ID "4."

The block having the individual ID "5" generates a signal with the own individual ID related to the identification number of the joint position and the individual ID of the connected block and transmits the generated signal to the block having the individual ID "1" one step higher. As shown in the figure, if two or more blocks are connected, these are collectively expressed as [5:J3(6), J8(7)] for example. Note that [J3] and [J8] are indicative of the identification numbers of the joint positions at which the blocks having the individual IDs shown in parentheses are connected.

As described above, the information about the entire solid object is collected on the block having the individual ID "1." Like other blocks, the block having the individual ID "1" generates a signal with the own individual ID related to the identification number of the joint position and the individual ID of the connected block. Next, the block having the individual ID "1" transmits the generated signal to the host terminal 10 along with a signal transmitted from the lower block. The host terminal 10 stores, in the registration information storage unit 52, the information with the size and shape of each block and the identification number of the joint position related with the individual ID of each block.

Consequently, on the basis of the information transmitted from the block having the role of hub in the solid object, the connection relation of blocks and the shape of the solid object can be identified in realtime. It should be noted that, in realizing the above-mentioned form, the block 102 further includes functional blocks of an inter-block communication unit for transmitting and receiving information related with the connection with other blocks and a collected information transmission unit for transmitting the collected information to the host terminal 10. These functional blocks may be implemented by the identification information transmission unit 122 or the identification information reception unit 124 shown in FIG. 4.

Referring to FIG. 10, there is shown an example of a structure of data that is stored in the registration information storage unit 52 of the host terminal 10 so as to identify block connection relation. A block information table 180 includes an individual ID column 182, a shape column 184, a size column 186, and joint position column 188. The individual ID column 182 lists individual IDs of blocks. If there are two or more blocks of the same shape, then two or more individual IDs may be listed in the individual ID column 182. The shape column 184 lists such block shapes illustrated in FIG. 1 as "quadratic prism" and "cube." The size column 186 lists the width, depth, and length of each block.

The joint position column 188 lists the joint position arranged on each block as related with an identification number thereof. In the example shown in FIG. 10, each joint position is written in a format of "identification number of joint position (face number), x coordinate and y coordinate on the face concerned." The face number is uniquely determined for each face of a block in advance. For example, a block having an individual ID "0001" is a quadratic prism that is 4 cm in width, 4 cm in depth, and 8 cm in length. A joint position with an identification number being "J1" is located at coordinates (2, 2) of a first face. A joint position with an identification number being "J2" is located at coordinates (1, 2) of a second face. However, the present embodiment is not limited to the format mentioned above.

The host terminal 10 can acquire the information shown in FIG. 9 from any of blocks making up the solid object and reference the block information table 180, thereby identifying states of the solid object being assembled and after assembly and the individual IDs of blocks making up the parts of the solid object. For example, preparing the three-dimensional models of the blocks and interconnecting these three-dimensional models in a virtual space displayed on the display apparatus 12 on the basis of the transmitted connection relation allow the representation, inside the screen, of the three-dimensional graphics having the same shape as that of the real solid object.

Figure 11:
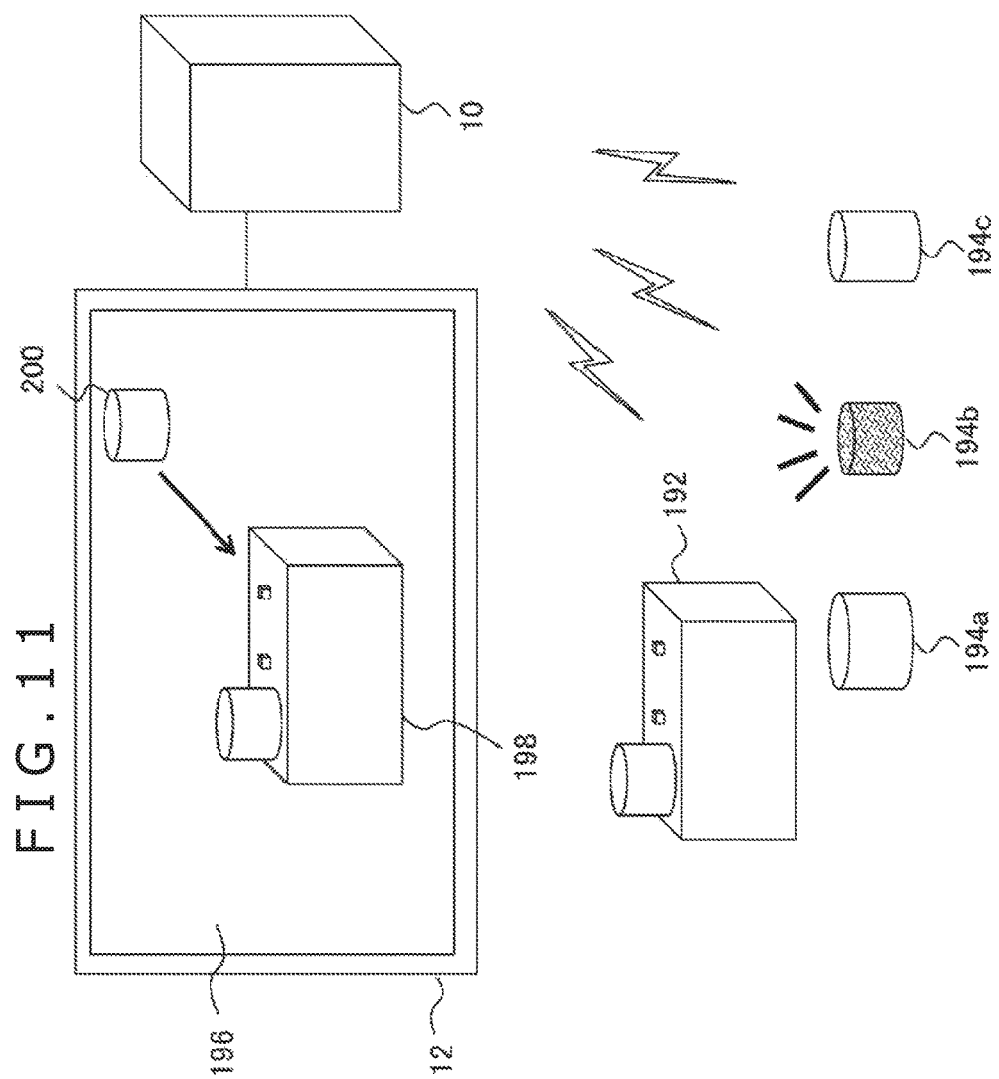
FIG. 11 is a diagram illustrating a form in which information related with an assembly procedure is provided to a user in the present embodiment.

Using the above-mentioned mechanism allows to show the user an assembly procedure along the actual progress in the assembly process of a solid object with a final shape already set. Referring to FIG. 11, there is shown a diagram illustrating a form in which the information related with an assembly procedure is provided to the user. In the figure, a solid object 192 is indicative of a state in which the solid object with a final shape set is being assembled. In the real world, there are two or more blocks 194*a*, 194*b*, and 194*c* including the blocks to be later connected to the solid object 192.

In the host terminal 10, the steps of the assembly process of the solid object 192 can be identified by a mechanism that acquires the connection relation described above. In the host terminal 10, images that describe the blocks to be connected next and the joint positions in each step are prepared and an image corresponding to an actual reached step is displayed on the display apparatus 12. A screen 196 shown in FIG. 11 is in a state where the above-mentioned description image is displayed, the screen 196 being configured by a solid 198 corresponding to the real solid object 192, a block 200 to be connected next, and an arrow indicative of the joint position. Such an image may have the same configuration as that of a page of a general assembly manual and may make description in text or video.

By doing so, only the information corresponding to actual situations can be presented, so that, especially with solid objects requiring many assembly processes, the user is saved with labor and time for searching many manual pages for corresponding information. On the other hand, if two or more blocks similar to the blocks to be connected next like the blocks 194*a*, 194*b*, and 194*c* remain, there is possibility that the displayed block 200 cannot be recognized to which of these blocks the block 200 corresponds. Therefore, the block to be connected next is made emit light in a predetermined color for discrimination from others.

Figure 12:
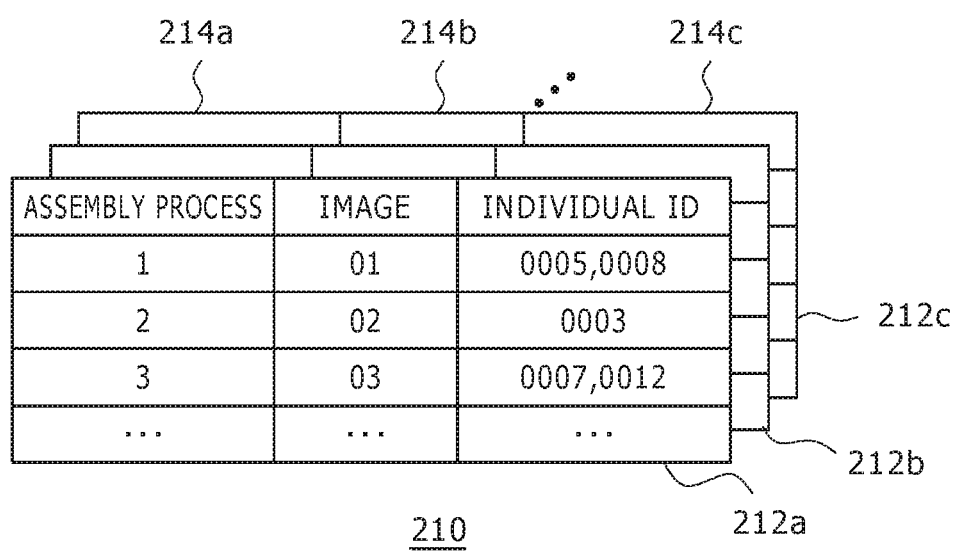
FIG. 12 is a diagram illustrating an assembly procedure and one example of a data structure of information held in the host terminal in a form for explicitly indicative of blocks to be connected next in the present embodiment.

FIG. 11 shows a state in which the block 194*b* emits light as a block to be connected next. This setup allows the user to associate the contents displayed on the screen 196 with a real solid object or block, thereby following correct assembly procedures with ease. Referring to FIG. 12, there is shown an example of a data structure of information held in the host terminal 10 in a form for displaying an assembly procedure and explicitly showing blocks to be connected next.

Assembly sequence information 210 has individual tables 212*a*, 212*b*, 212*c* and so on for the final solid object shapes, such as a car, a ship, a house, and a robot for example and is stored in the display contents storage unit 60 of the host terminal 10. Each of the tables 212*a*, 212*b*, and 212*c* includes an assembly process column 214*a*, an image column 214*b*, and an individual ID column 214*c*. Information to be listed in the assembly process column 214*a* is those with the assembly process sequence numbers indicated in the ascending order from 1. In this example, with each assembly process, the contents represented by one description image is one unit.

To be more specific, the case where one block is connected for one process and the case where two or more blocks are connected are possible. For example, if two or more blocks of the same shape are connected to two or more positions at the same time, it may be handled as one process because description images are arranged into one image. In the case where blocks of different shapes are connected, if the number of description images requires no more than one, then one process serves the purpose. If two or more blocks to be connected in one process are different in shape, then these two or more blocks are divided by color in the description image and the real blocks are made emit light in corresponding colors, thereby providing discrimination.

The image column 214*b* lists identification information of data of a description image to be displayed on the display apparatus 12, namely, an image data name or an image data storage address. The individual ID column 214*c* lists individual IDs of the blocks to be connected next. In a process in which two or more blocks are connected, the individual IDs of these two or more blocks are listed. In this case, in order to making each block emit light in the same color as that in the description image to be displayed, color information may be further listed for each block.

Figure 13:
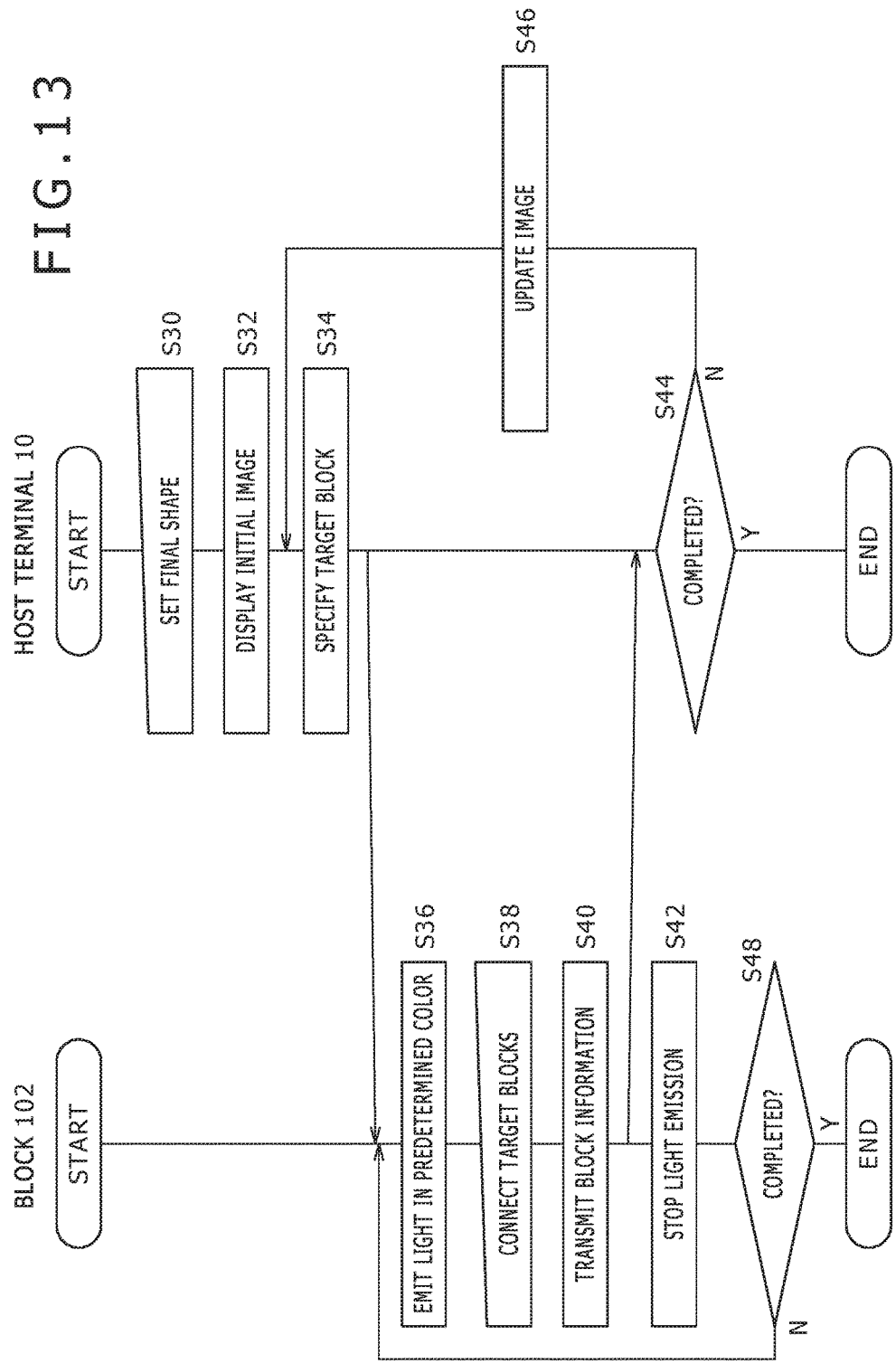
FIG. 13 is a flowchart indicative of a processing procedure for presenting information related with a block assembly procedure in the present embodiment.

The following describes an example of operations that are realized by the block 102 and the host terminal 10 through the configuration described above. Referring to FIG. 13, there is shown a processing procedure for presenting information related with a block assembly procedure in the present embodiment. Here, the block 102 is at least one of all blocks existing at that place, namely, the blocks making up a solid object being assembled, and the unconnected blocks. First, the user enters the setting of a final shape into the host terminal 10 (S30). For example, a list of a car, a ship, a house, and a robot in which the assembly sequence information 210 is prepared is presented to the display apparatus 12, a selective operation executed by the user through the input apparatus 14 is acquired by the input information acquisition unit 54, and the selective operation is notified to the information processing unit 58. It should be noted that, if the number of final shapes is set to one, then the processing of S30 can be skipped.

Under the control of the information processing unit 58, the display processing unit 56 of the host terminal 10 displays an initial image of a description image onto the display apparatus 12 (S32). At this moment, the information processing unit 58 references the table of assembly sequence information 210 corresponding to the preset final shape from the display contents storage unit 60 and reads the image data related with the first process (assembly process "1"), thereby making the display processing unit 56 execute display processing. Next, the information processing unit 58 reads the individual ID of a block to be connected from the individual ID column 214*c* of the table of the sequence information 210 and appropriately relates the read individual ID with a light-emission color, thereby transmitting the related individual ID to the block 102 on the site that is in a communicable state (S34).

The display unit 130 of the block 102 acquires the own individual ID from the identification information storage unit 120 and, if this individual ID is the individual ID transmitted from the host terminal 10, emits light in a requested color (S36). This allows the user to easily determine which of the blocks to be connected in a description image displayed on the display apparatus 12 corresponds to which real block. If the user connects these blocks with each other (S38), the states of the connected blocks are collected in the form shown in FIG. 9 to be transmitted to the host terminal 10 (S40).

The block that emitted light in S36 stops emitting light upon connection in S38 (S42). On the other hand, if the state of the block concerned has not reached the final shape, the host terminal 10 determines that the block has not been completed (N of S44), thereby advancing the process to be presented by one step. Namely, the image data related to the second process (assembly process "2") in the table of the assembly sequence information 210 is read to update the display on the display apparatus 12 (S46). Then, the individual ID of the block to be connected in this process is transmitted to all blocks 102 by relating with a light-emission color (S34).

The block 102 corresponding to the individual ID transmitted from the host terminal 10 emits light in a requested color (S36) and the user connects the blocks that are emitting light by following a description image (S38). The information related with the connection relation of the blocks in a solid object being assembled is transmitted from this solid object to the host terminal 10 (S40). Next, the block connected in this process stops emitting light (S42). Subsequently, the processing operations from S34 to S46 are repeated until the solid object reaches the final shape (N of S48, N of S44). Then, when the final shape is reached, the processing comes to an end (Y of S48, Y of S44).

FIG. 11 shows that the block 194*b* to be connected to the uncompleted solid object 192 is made emit light so as to make it easy for the user to understand which of the real blocks does correspond to the block subject to connection in the description image. On the other hand, it is also practicable that the joint position of the solid object 192 is made emit light along with the block 194*b* to be connected. In this case, the basic processing may be the same as that described above; namely, the host terminal 10 may further transmit the individual ID of the block including the joint position of the solid object 192 and the identification information of the joint position to the block 102. In the block corresponding to this individual ID, the joint position having the specified identification information, namely, the part around the projection part or a recessing part is made emit light. This setup allows the user to easily recognize both the block subject to connection and the joint position in the uncompleted solid object, thereby saving the displaying of a description image in some cases.

Further, if the user performs an erroneous assembly, the fact may be notified to the user. In this case, when the information about the connection relation is transmitted from the solid object in S40, the host terminal 10 determines the correctness by comparing the block connected in S38 and the joint position thereof with the original block to be connected and the joint position thereof. If an error is found at least in any of these, the connected block and the joint position in this column are flashed in red for example. It is also practicable to have the display apparatus 12 display an alert thereof or generate alert sound.

Figure 14:
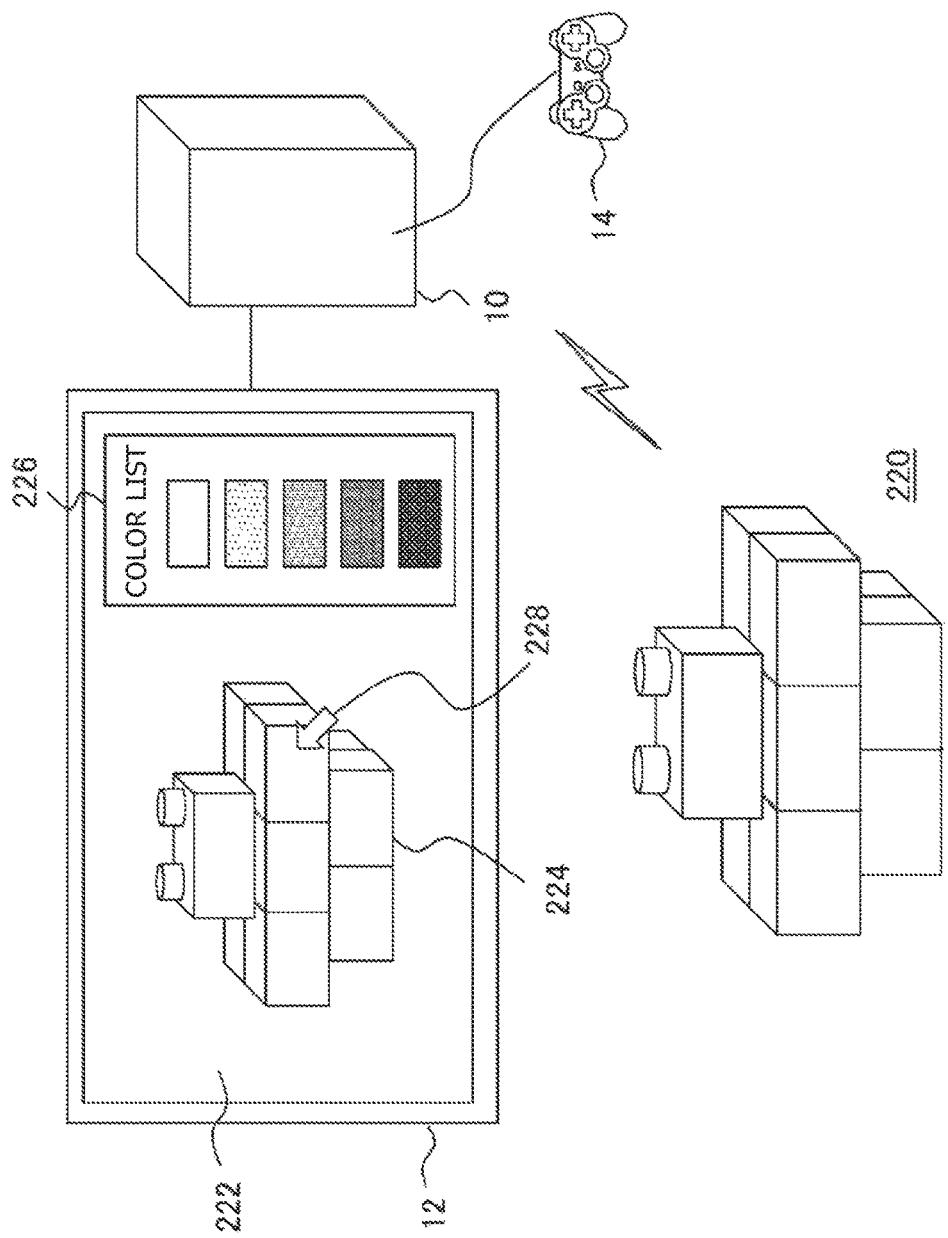
FIG. 14 is a diagram illustrating a form in which the user sets display contents of a completed solid object in the present embodiment.

Described above is the light emission in the process of assembling blocks; it is also possible to make light emission for the purpose of decoration for example after the completion of assembly. For example, at the time of the completion of a solid object, the user sets the light-emission color and the display image of each block by use of the host terminal 10 and transmits the information thereof to each of the blocks that make up the solid object. Consequently, it becomes practicable to color the solid object in accordance with user preference or in match with the color of a real object that the solid object simulates or to make some blocks display desired images. Referring to FIG. 14, there is shown a diagram illustrating a manner in which the user sets the display contents of a completed solid object. In the figure, a solid object 220 is assembled by the user from plural blocks.

The connection relation of the blocks in the solid object 220 and the shape of the solid object 220 are transmitted to the host terminal 10 along the information transmission route as shown in FIG. 9. It should be noted that, by entering the information about the completion of assembly of the solid object 220 into the host terminal 10 by the user at the time of the completion of assembly, the host terminal 10 may give a set ID to this solid object 220 and an in-set individual ID to each of the blocks making up the solid object 220. The information about these IDs is transmitted to each of the blocks making up the solid object to be stored in the corresponding area in the identification information storage unit 120 shown in FIG. 5. In this case, the identification of blocks in the subsequent processing may be made by use of the set ID and the in-set individual ID instead of the individual ID.

On the basis of the information about the connection relation transmitted from the solid object 220, the host terminal 10 draws an image by use of the three-dimensional graphics technology as described above, thereby displaying a display contents setting screen 222 on the display apparatus 12. The display contents setting screen 222 includes an image 224 of the solid object 220 and a display contents select area 226 for the selection of display contents of each block. The display contents select area 226 in the figure is indicative of a list of selectable colors for setting block light-emission colors. In addition, the display contents setting screen 222 displays a cursor 228 for the user to move it on the screen through the input apparatus 14 so as to indicate a target to be selected.

For example, the user moves the cursor 228 to a block to which a color is to be set and selects this block by executing an enter operation on the input apparatus 14. Next, the user moves the cursor 228 to the color to be set in the color list of the display contents select area 226 and executes the enter operation, thereby relating the block with the color. The user executes this operation on all blocks to which colors are to be set. Then, the host terminal 10 relates the individual ID of each block with the identification information of the color set to each block and transmits the related information to each of the blocks making up the solid object 220. Consequently, the display unit 130 of each block to which a color is set identifies the color set to the own block on the basis of the own ID, thereby emitting light in that color.

It should be noted that, if a block has a display, then an image may be selected on the display contents setting screen 222, thereby relating the block with the image data. In addition, with the display contents setting screen 222, an operation for collecting two or more blocks into one group may be accepted, thereby allowing the setting of colors on a group basis for example. This form is especially effective if the number of blocks making up the solid object 220 is large. At this moment, the host terminal 10 gives in-set group IDs to the formed groups and transmits these in-set group IDs to the solid object 220, thereby storing these in-set group IDs into the identification information storage unit 120 of the blocks that belong to the group concerned.

The information set by the user on the display contents setting screen 222 may be stored in the host terminal 10. At this time, storing this information along with the information related with the connection relation of the solid object 220 allows the reassembly of the solid object 220 from the disassembled blocks, emitting light or making display in the same manner as before. It should be noted that the information related with the connection relation may be similar to the information shown in FIG. 9 that is transmitted to the host terminal 10. Referring to FIG. 15, there is shown an example of a data structure of the information set by the user to the display contents setting screen 222.

Display contents setting information 230 is structured to have individual tables 232a, 232b, 232c, and so on for each solid object and each set ID, which are stored in the display contents storage unit 60 of the host terminal 10. Each of the tables 232a, 232b, 232c, and so on includes an in-set group ID column 234a, an in-set individual ID column 234b, an individual ID column 234c, and a light-emission color column 234d. The in-set group ID column 234a lists identification information to be given to a group when the user has collected two or more blocks into the group as described above. The in-set individual ID column 234b lists information for identifying blocks that belong to a solid object.

The individual ID column 234c lists an individual ID of the block concerned. The light-emission color column 234d lists identification information such as names of light-emission colors set by the user. In the case of this figure, the light-emission colors are set on a group basis. For example, a group having a group ID "001" is made up by three blocks having in-set individual IDs "001," "002," and "003." These three blocks originally have individual IDs "0008," "0004," and "0002" and set so that these blocks emit light in "red."

It should be noted that, if the correlation between the in-set individual ID and the individual ID is stored in each block making up a solid object, only any one of the IDs may be included in a light emission request from the host terminal 10. On the other hand, storing this correlation in the host terminal 10 makes it unnecessary, in reassembling the disassembled blocks, to give the in-set individual IDs again. Thus, storing the information related with the connection relation of the blocks and the display contents setting information by relating these pieces of information with each other makes it easy to reproduce and create not only solid objects created by the user in the past and solid objects recommended by block makers but also solid objects created by other users.

Referring to FIG. 16, there is shown a diagram illustrating a form in which information related with solid objects is shared by use of a network. In the figure, the host terminal 10 is connected to a server 302 through a network 300. The server 302 may be a server of a block maker or a server to which individual persons can upload data in order to share the information about solid objects. When the user selects a desired solid object from a publicized solid object image list for example in the host terminal 10, then information about the block connection relation and display contents setting information are transmitted from the server 302, these pieces of information being necessary for the creation of the solid object concerned. At this moment, if there is a description image indicative of an assembly sequence as shown in FIG. 11, then the assembly sequence information 210 shown in FIG. 12 and data of the description image are transmitted together.

However, even if there is no such information, a similar description image can be created on the side of the host terminal 10 on the basis of the information about connection relation. On the basis of the description image displayed on the display apparatus 12, the user assembles blocks. As described with reference to FIG. 11, a block to be connected may be made emit light. In this case, giving a light emission request from the host terminal 10 to a block by use of not an individual ID uniquely allocated to the block but a part ID allocated to each block shape allows the identification of the own block having the same shape as that of another user. As described above, a part ID may be stored in a block itself; alternatively, a table in which a part ID is related with an individual ID may be prepared in the host terminal 10 so as to convert the part ID of each block transmitted from the server 302 into an individual ID in the host terminal 10, thereby giving a light emission request.

When the solid object 240 is completed, the host terminal 10 references the display contents setting information acquired from the server 302 and transmits a light emission request specifying a light-emission color of each block to the solid object 240. It should be noted that, in a solid object created by another user, the individual ID of each of the blocks making up the solid object is different, so that the same part is made emit light in the same color by use of the in-set individual ID or the part ID given to the position of the solid object of another user under the same rules. Each of the blocks making up the solid object 240 identifies the color set to each block on the basis of the transmitted light-emission request, thereby emitting light in the identified color. Consequently, it becomes easy for the user to create the solid object 240 having the same shape and color as those of the solid object (the image 242) selected from the publicized list.

It should be noted that the light-emission color and the display image of each block may be changed in a temporal manner. In this case, if data to which change and switching of display contents are set along the time axis is created for each block or each group of blocks, then the other processing operations are the same as those described above. In the present embodiment, display contents are set to the blocks in a state in which these blocks make up a solid object, so that it is practicable to provide staging of change not on a block basis but on the surface of a solid object, such as totally changing the color of the solid object or changing patterns thereof for example.

It should also be noted that, instead of setting of display contents as described above in advance, executing changing in realtime in accordance with a user operation done on the host terminal 10 allows the combination of a solid object made up of blocks with a computer game. Referring to FIG. 17, there is shown a diagram illustrating a manner in which blocks are combined with a computer game. This figure shows an example where a computer game is played, in which a home base occupying game to occupy the opponent home base is played on a game board formed by an assembly of blocks.

First, the user assembles two or more blocks as preset so as to create a game board 250 shown. It should be noted that the figure shows a flat, square board which is formed by horizontally and vertically connecting 6 times 6 blocks of the same shape; it is also practicable to form a board of a more complicated cubic shape. The host terminal 10 identifies in advance at which position of the game board 250 which block is assembled on the basis of the information about the connection relation transmitted from the game board 250. In addition, block light-emission colors are allocated for the game players in advance.

Next, a corresponding computer game is started on the host terminal 10. The game players execute operations for playing a game through an input apparatus 14a and an input apparatus 14b. At this moment, a game screen 252 indicative of game progression is displayed on the display apparatus 12. In this figure, a situation in which a dice is thrown is displayed; it is also practicable to play a more complicated game or display a more complicated game screen. In accordance with the points acquired by the players in a computer game, the host terminal 10 changes the block light emission in the game board 250.

To be more specific, in accordance with the increase in the number of points, the number of light-emitting blocks is increased so as to increase the area of the color allocated to each player. The blocks to be newly made emit light may be determined by the host terminal 10 by following predetermined rules or the players themselves may specify a game on the screen 252. In the example shown in FIG. 17, the number of blocks that emit light is sequentially increased from the block lines making up the two sides opposed on the game board. However, depending upon the contents of a computer game to be played on the host terminal 10, the change in display on the game board 250 may be various. For example, displaying chess pieces on the displays arranged on the blocks enables the reflection of a board game such as chess being played as a computer game onto the real game board 250.

According to the present embodiment described above, a display mechanism such as a light-emitting diode or a display and a communication mechanism for providing communication with the host terminal are arranged on interconnectable blocks, thereby changing the display contents such as a light-emission color in accordance with a signal transmitted from the host terminal. This configuration allows the realization of blocks that can express various pieces of information without limitation while preventing the internal configuration from getting complicated and without damaging the external view.

For example, in tidying up the blocks brought by two or more users, the owners of blocks can be identified by the colors of the blocks and, in assembling blocks as preset, the blocks to be connected next can be identified. In addition, it is practicable to make an assembled solid object emit light in colors in accordance with the user setting and display images in accordance with the setting.

Further, arranging a mechanism for short-distance wireless communication on blocks and preparing a reader/writer connected to the host terminal allow the writing of the identification information of owner or the like on each block itself and the reading of block identification information by the host terminal with ease. Consequently, the communication with the host terminal can easily be realized without requiring time and labor for the connection and the setting for communication establishment and without affecting the external view, which allows little children to easily handle the blocks. In addition, it is easy to combine a virtual world displayed in a computer game with a real object made up by blocks, thereby realizing a tool excellent in designability and entertainment.

In addition, recording the information about the connection relation of an assembled solid object and the information about display contents such as light-emission colors makes it easy to reproduce the solid objects created by the user in the past. Further, it is also practicable to share the information about solid objects, such as trying to create favorite one of the solid objects publicized by block makers or other persons.

The present invention has been described on the basis of an embodiment. It is to be understood by those skilled in the art that the present embodiment is illustrative, that the combination of components and processes can be modified in various ways, and that such modification examples also fall within the scope of the present invention.

For example, in the present embodiment, a form in which each block holds only the individual ID of the block and the other attributes are managed by the side of the host terminal and a form in which the other attributes are also held by the side of the block are illustrated by way of example. Here, it is also practicable to manage any of "the other attributes" by a server such as a cloud server connected to the host terminal through a network and make the host terminal execute inquiry as required. Anyhow, as the information held in the block gets smaller, the dependence on the host terminal and the server gets greater, while making the necessary memory capacity smaller, thereby leading to the reduced block manufacture cost.

Conversely, as the information held by the block gets greater, request signals from the host terminal and the server can be put in abstraction, so that various forms can be realized not under the control of the host terminal and the server on which detail information is registered. Therefore, an entity that holds necessary information may be appropriately determined from the viewpoints of block use purpose, use form, cost restriction, and the like. In this sense, more information than the information described in the present embodiment may be held in the block. For example, at least part of information that is held in the host terminal, such as the assembly sequence information 210 shown in FIG. 12 and the display contents setting information 230 shown in FIG. 15 may be held in the block.

The configuration described above allows the carrying of an assembly manual and the display setting after assembly in addition to the blocks. Making each block itself hold various types of information related with each block allows the use of blocks as if a USB memory were connected.

If the owner ID of each block is acquired by the host terminal 10 in S14 during the tidying-up processing procedure shown in FIG. 4, then this owner ID may be stored as a log related with the situation in which a game was played. To be more specific, the owner ID is related with the individual IDs of all blocks subject to tidying-up and the date on which the processing of S14 is executed is related therewith, thereby storing the resultant related information into the registration information storage unit 52 of the host terminal 10 as a play log. Further, the connection relation of a solid object assembled at that time may be acquired and related with the above-mentioned information as described with reference to FIG. 9. Consequently, the information about the play mates, the play time, the blocks used for play, and the solid objects assembled may be displayed on the display apparatus 12 for example whenever desired.

In addition, a configuration in which the log recorded as described above can be automatically uploaded or manually uploaded by a user operation to servers that provide such various information publication services as web logs and an SNS (Social Networking Service) allows the publication of the log as "block blog" with ease. The sharing of the information related with solid objects as described with reference to FIG. 16 may be realized through the web page of such a personal blog.

Further, since the host terminal can recognize the connection relation of a solid object made up of an assembly of blocks, the information related with this connection relation may be used as an authentication key at the time of login. In this case, instead of the individual ID column 162*a* in the owner ID table 160 shown in FIG. 7, a table having a column for storing the information about the connection relation of two or more blocks as shown in FIG. 9 is stored in advance in the registration information storage unit 52 of the host terminal 10. In order to create this table, the user creates a solid object of preference and registers the created solid object as an authentication key. Next, at the time of login for example, the user enters his or her login name into the host terminal and, at the same time, assembles blocks in the same manner as when the blocks were registered.

The host terminal acquires the information about the connection relation from the assembled blocks and compares the acquired information with the contents of the registration, thereby determining whether or not the authentication is successful. Further, if the authentication is found successful, the host terminal may make the block emit light in a predetermined successful color such as blue and, if the authentication is found unsuccessful, in a predetermined unsuccessful color such as red. Thus, a unique form of authentication based on an act of block assembly can be realized.

Still further, an assembled block may be used as a controller of such information processing to be executed by the host terminal as a computer game. In this case, the block is arranged with such functions for detecting external contact and force as a switch, a touch sensor, and an impact sensor. Then, in the assembled solid object, the block having the above-mentioned functions is allocated to various operations to be executed in a game, for example. The allocation may be executed automatically by the host terminal in accordance with the functions of the block and the contents of the information processing or set manually by the user. The allocation results are held in the registration information storage unit 52 of the host terminal 10 with the in-set individual ID related with the contents of operation for example.

The time of use, the host terminal recognizes, through the information transmission route as shown in FIG. 9, push, contact, and impact applied to the block corresponding to the contents of operations in accordance with the detection methods, thereby making the processing progress accordingly. Consequently, the user can execute game operations by use of the controller having operation means having a shape of preference and arranged at a position of preference.

In addition, an assembled solid object may be related with a character of a computer game that is processed by the host terminal. In this case, the group ID given to the solid object is related with the identification information of the character and the related information is stored in the registration information storage unit 52 of the host terminal 10. Then, when the related character appears on a game screen shown on the display apparatus 12, a request signal may be transmitted from the host terminal for making the solid object emit light. This configuration can realize the fusion between a computer game and a real object like the form of a game board shown in FIG. 17.

REFERENCE SIGNS LIST

1 . . . Block system, 10 . . . Host terminal, 12 . . . Display apparatus, 14 . . . Input apparatus, 22 . . . CPU, 24 . . . GPU, 26 . . . Main memory, 50 . . . Identification information reception unit, 52 . . . Registration information storage unit, 54 . . . Input information acquisition unit, 56 . . . Display processing unit, 58 . . . Information processing unit, 60 . . . Display contents storage unit, 62 . . . Identification information transmission unit, 64 . . . Display information transmission unit, 102 . . . Block, 120 . . . Identification information storage unit, 122 . . . Identification information transmission unit, 124 . . . Identification information reception unit, 126 . . . Identification information update unit, 128 . . . Display information reception unit, 130 . . . Display unit

INDUSTRIAL APPLICABILITY

As described above, the present invention is applicable to toys such as blocks, game machines, assembly-type apparatuses, learning tools, content display terminals, information processing apparatuses, and robots.

The invention claimed is:

1. A block system comprising:
a host unit; and
a plurality of blocks, wherein each block comprises:
    a wireless communication unit for communicating wirelessly with the host unit; and
    a wired communication unit for direct communicating via a wired connection with at least a first block from the plurality of blocks;
    a storage unit for storing a unique individual ID; and
    a display unit;
wherein the host unit further comprises:
    a registration information storage unit for storing the unique individual ID of each of the plurality of blocks in association with a user ID; and
    a display information transmission unit for communicating with the wireless communication unit of each of the plurality of blocks;
    wherein, when the host unit transitions from a building mode to a tidying-up mode, the display information transmission unit transmits, to a first subset of blocks from the plurality of blocks associated with a first user ID in the registration information storage unit, instructions to the first subset of blocks to cause the display units of the first subset of blocks to display a first color, and wherein, during the tidying-up mode, the display information transmission unit transmits, to a second subset of blocks from the plurality of blocks associated with a second user ID in the registration information storage unit, instructions to the second subset of blocks to cause the display units of the second subset of blocks to display a second color different than the first color.

2. The block system according to claim 1, wherein the display information transmission unit communicates with the wireless communication unit of each of the plurality of blocks using short distance wireless communication.

3. The block system according to claim 1, wherein a first user associated with the first user ID can change the first color using an input device of the host unit.

4. The block system according to claim 1, wherein the storage unit of each block further stores the unique individual ID of any block directly coupled to the wired communication unit of each block during the building mode.

5. The method of assembling a plurality of block to form a solid object in a block building mode, the method comprising:

reading, using a host unit, assembly instructions for the solid object from a memory; and for each instruction step in the assembly instructions:
a) causing a block from the plurality of blocks identified in the instruction step to emit light in a predefined color;
b) displaying, on a display of the host unit, display information depicting how the block is to be connected to another block from the plurality of blocks;
c) transmitting, from a communication unit of the block, connection information indicating that the block has been connected to the another block; and
d) causing, by the host unit, the block to stop emitting light in the predefined color upon a determination that the connection information is correct, wherein a)-d) are repeated until each instruction step in the assembly instructions has been executed to assemble the solid object from the plurality of blocks.

6. The method according to claim 5, further comprising:
after the solid object has been assembled, transitioning the host unit from the block building mode to a tidying-up mode, wherein, during the tidying-up mode, the host unit:
e) reads, from a memory, a user ID associated with each block from the plurality of blocks; and
f) causes each block to emit a color based on the user ID associated with each block, wherein a first color associated with a first user ID is different than a second color based on a second user ID.

7. The method according to claim 5,
wherein the display information is an depicting how the block is to be connected to another block from the plurality of blocks.

8. The method according to claim 5, wherein if it is determined that the connection information is incorrect, the display of the host unit displays a warning indicating that the connection information is incorrect, a determination that the connection information is correct.

9. The method according to claim 5, further comprising:
e) displaying, using the display of the host unit, an updated image of a partially assembled object in accordance with the received connection information.

10. The method according to claim 5, further comprising:
after assembly of the solid object, allowing a user to set, using the host unit, a display color for each of the plurality of blocks forming the solid object; and storing the display color for each of the plurality of blocks in association with the assembly.

* * * * *